US009144030B2

(12) United States Patent
Iyama et al.

(10) Patent No.: US 9,144,030 B2
(45) Date of Patent: Sep. 22, 2015

(54) MOBILE COMMUNICATION TERMINAL

(75) Inventors: Takahiro Iyama, Yokohama (JP); Teruo Onishi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 293 days.

(21) Appl. No.: 13/697,679

(22) PCT Filed: Apr. 18, 2011

(86) PCT No.: PCT/JP2011/059535
§ 371 (c)(1),
(2), (4) Date: Dec. 11, 2012

(87) PCT Pub. No.: WO2011/142214
PCT Pub. Date: Nov. 17, 2011

(65) Prior Publication Data
US 2013/0077522 A1    Mar. 28, 2013

(30) Foreign Application Priority Data
May 14, 2010    (JP) ................................. 2010-112285

(51) Int. Cl.
*H04W 52/22*    (2009.01)
*H04W 52/12*    (2009.01)
(Continued)

(52) U.S. Cl.
CPC ............ *H04W 52/225* (2013.01); *H04W 52/12* (2013.01); *H04W 52/16* (2013.01); *H04W 52/228* (2013.01); *H04W 52/346* (2013.01)

(58) Field of Classification Search
CPC ... H04W 52/12; H04W 52/16; H04W 52/225; H04W 52/228; H04W 52/346
USPC .......... 370/252, 318, 332, 328, 329; 455/522, 455/127.1, 517, 561
See application file for complete search history.

(56) References Cited

U.S. PATENT DOCUMENTS

| 6,351,651 B1* | 2/2002 | Hamabe et al. ................ 455/522 |
| 2002/0003785 A1* | 1/2002 | Agin ............................. 370/333 |

(Continued)

FOREIGN PATENT DOCUMENTS

| EP | 1 931 160 | 6/2008 |
| JP | 4383480 | 12/2009 |

OTHER PUBLICATIONS

International Search Report issued May 17, 2011 in PCT/JP11/59535 Filed Apr. 18, 2011.
(Continued)

*Primary Examiner* — Andrew Lai
*Assistant Examiner* — Mahmudul Hasan
(74) *Attorney, Agent, or Firm* — Oblon, McClelland, Maier & Neustadt, L.L.P.

(57)    ABSTRACT

A mobile communication terminal includes: a transmission power controlling unit for performing transmission power control such that the sum of channel transmission powers or the sum of the ratios of the channel transmission powers to threshold values of the corresponding channels is a predetermined target value; an average transmission power calculating unit for calculating the average value of the sum of the channel transmission powers in a set monitoring period or the average value of the sum of the ratios of the channel transmission powers in the set monitoring period to the threshold values of the corresponding channels; and a transmission power suppressing unit for performing reduction control of the transmission powers such that these average values in a set control period are each equal to or less than the threshold value.

16 Claims, 17 Drawing Sheets

(51) Int. Cl.
H04W 52/16 (2009.01)
H04W 52/34 (2009.01)

(56) References Cited

U.S. PATENT DOCUMENTS

| | | | |
|---|---|---|---|
| 2002/0094835 A1* | 7/2002 | Hayashi et al. | 455/522 |
| 2002/0094837 A1* | 7/2002 | Hamabe et al. | 455/522 |
| 2003/0202490 A1* | 10/2003 | Gunnarsson et al. | 370/332 |
| 2004/0014425 A1* | 1/2004 | Unno | 455/69 |
| 2004/0110477 A1* | 6/2004 | Nishimura et al. | 455/127.1 |
| 2005/0186923 A1* | 8/2005 | Chen et al. | 455/127.1 |
| 2007/0021139 A1* | 1/2007 | Baker et al. | 455/522 |
| 2008/0045271 A1* | 2/2008 | Azuma | 455/561 |
| 2009/0149210 A1* | 6/2009 | Hosokawa | 455/522 |
| 2009/0154403 A1* | 6/2009 | Niwano | 370/329 |
| 2010/0273518 A1 | 10/2010 | Suzuki et al. | |
| 2011/0287804 A1* | 11/2011 | Seo et al. | 455/522 |
| 2012/0106490 A1* | 5/2012 | Nakashima et al. | 370/329 |

OTHER PUBLICATIONS

Extended European Search issued Jun. 12, 2015 in European Application No. 11780471.6.

* cited by examiner ial of wireless systems, carrier aggregation, spectrum aggregation, and the like and can simultaneously transmit data through a plurality of channels from one or more antennas. The mobile communication terminal of the present invention includes a transmission power controlling unit, an average transmission power calculating unit, and a transmission power suppressing unit. The transmission power controlling unit performs transmission power control such that the sum of# MOBILE COMMUNICATION TERMINAL

TECHNICAL FIELD

The present invention relates to a mobile communication terminal that simultaneously transmits data through a plurality of channels at the time of wireless communication with a base station apparatus.

BACKGROUND ART

Up to now, in a mobile communication system for mobile phones and the like, transmission power control is performed on wireless communication between a base station and a mobile communication terminal. In general, this transmission power control is performed such that the reception level of the base station, the ratio of the reception level to noise, or the ratio of the reception level to the sum of noise and interference is constant. The mobile communication terminal transmits data with a relatively small transmission power when being located near the base station, and transmits data with a relatively large transmission power when being located far from the base station. Such a mechanism can maintain the channel quality of the wireless communication, and also can achieve lengthened battery duration of the mobile communication terminal.

Patent literature 1 describes a method for minimizing a decrease in channel quality while further reducing consumed power. The average transmission power in a set control period is made equal to or less than a given value, whereby an increase in transmission power is prevented when the channel quality is poor.

PRIOR ART LITERATURE

Patent Literature

Patent literature 1: Japanese Registered Patent No. 4383480

SUMMARY OF THE INVENTION

Problems to be Solved by the Invention

Patent literature 1 presupposes that a mobile communication terminal makes wireless communication with a wireless base station of one wireless system. Meanwhile, in a mobile communication terminal that is capable of multiple input multiple output (MIMO), simultaneous transmission to a plurality of wireless systems, carrier aggregation, spectrum aggregation, and the like and can simultaneously transmit data through a plurality of channels from one or more antennas, transmission powers radiated from the antennas need to be optimized on the basis of comprehensive judgment. The present invention solves the above-mentioned problem.

Means to Solve the Problems

A mobile communication terminal of the present invention is capable of MIMO, simultaneous transmission to a plurality of wireless systems, carrier aggregation, spectrum aggregation, and the like and can simultaneously transmit data through a plurality of channels from one or more antennas. The mobile communication terminal of the present invention includes a transmission power controlling unit, an average transmission power calculating unit, and a transmission power suppressing unit. The transmission power controlling unit performs transmission power control such that the sum of channel transmission powers or the sum of the ratios of the channel transmission powers to threshold values of the corresponding channels is a predetermined target value. The average transmission power calculating unit calculates the average value of the sum of the channel transmission powers in a set monitoring period or the average value of the sum of the ratios of the channel transmission powers in the set monitoring period to the threshold values of the corresponding channels. The transmission power suppressing unit performs, if these average values calculated by the average transmission power calculating unit are each equal to or more than the threshold value, reduction control of the transmission powers such that these average values in a set control period are each equal to or less than the threshold value. Note that, herein, the channel refers to a physical transmission path such a communication cable that carries electrical signals and optical signals and a space that carries radio waves, and refers to a physical channel or a propagation channel.

According to the present invention, the transmission power controlling unit controls the transmission powers so as to, for example, secure the channel quality. Further, if the average value of the sum of the channel transmission powers in the monitoring period or the average value of the sum of the ratios of the channel transmission powers in the monitoring period to the threshold values of the corresponding channels is equal to or more than the threshold value, the transmission power controlling unit controls the transmission powers. This operation is performed by the transmission power suppressing unit, and, because the control is performed such that these average values are each equal to or less than the threshold value, a decrease in channel quality can be minimized while consumed power can be reduced.

The control period includes the monitoring period and a transmission power suppression period following the monitoring period. If the average value of the sum of the channel transmission powers from the antennas in the monitoring period or the average value of the sum of the ratios of the channel transmission powers in the monitoring period to the threshold values of the corresponding channels is equal to or more than the threshold value, the transmission power suppressing unit reduces the transmission powers in the transmission power suppression period such that these average values are each equal to or less than the threshold value.

According to the present invention, the transmission powers in the transmission power suppression period following the monitoring period are controlled on the basis of the average transmission powers in the monitoring period that is an earlier period of the control period. Accordingly, the average transmission powers in the control period can be efficiently reduced.

Effects of the Invention

According to the mobile communication terminal of the present invention, if the average value of the sum of transmission powers of respective channels in a monitoring period or the average value of the sum of the ratios of the transmission powers of the respective channels in the monitoring period to threshold values of the corresponding channels is equal to or more than the threshold value, reduction control of the transmission powers is performed such that these average values are each equal to or less than the threshold value over an entire control period. Accordingly, a decrease in channel quality can be minimized while consumed power can be reduced.

DETAILED DESCRIPTION OF THE EMBODIMENTS

Figure 1:
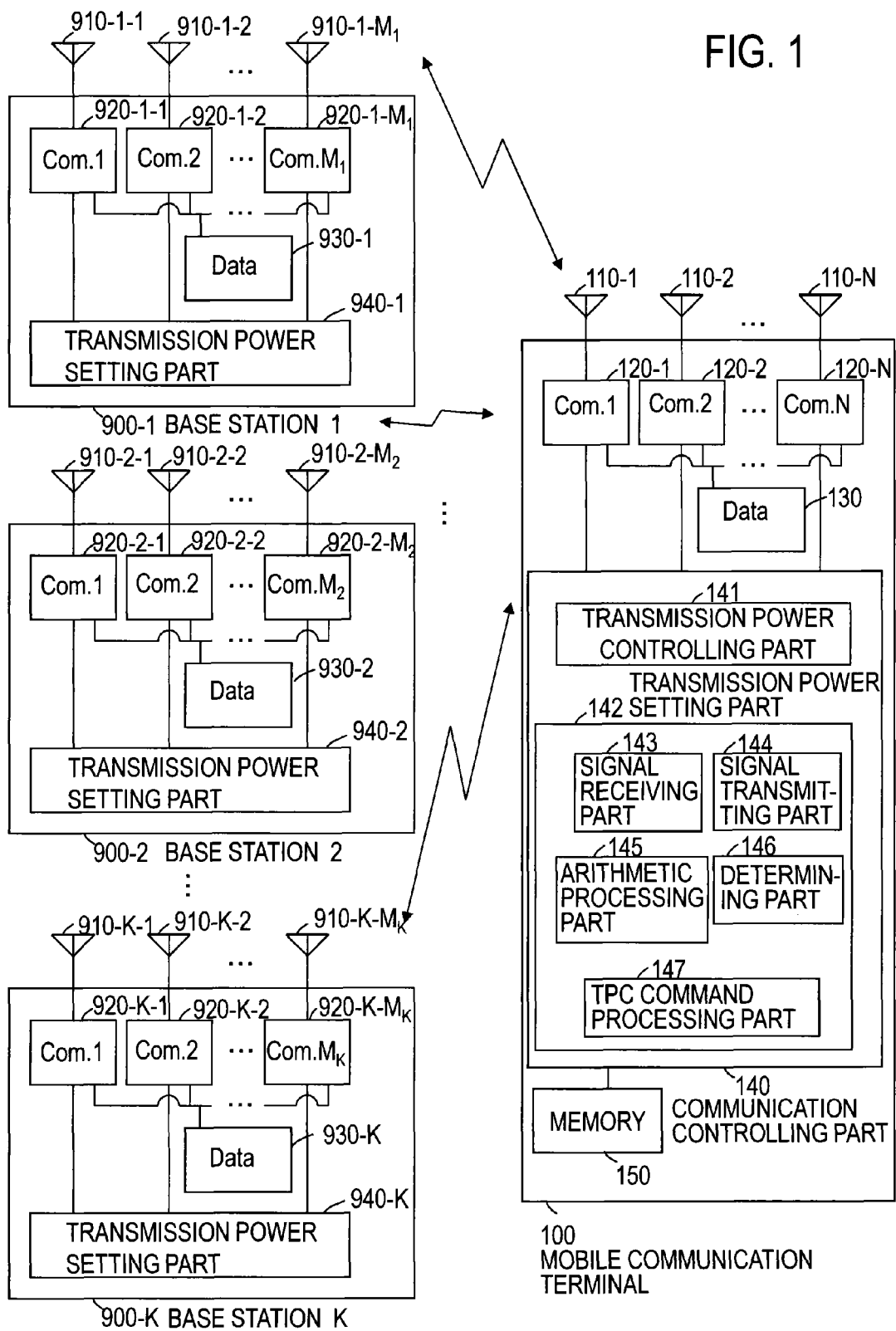
FIG. 1 is a configuration diagram showing an example of a mobile communication system to which a mobile communication terminal of the present invention is applied.

Hereinafter, embodiments of the present invention are described in detail.
[First Embodiment]
FIG. 1 is a configuration diagram showing an example of a mobile communication system to which a mobile communication terminal of the present invention is applied. This mobile communication system includes a mobile communication terminal 100 and base stations 900-1 to K (K is an integer equal to or more than 1). Note that this mobile communication system assumes MIMO, simultaneous transmission/reception to/from a plurality of wireless systems, carrier aggregation, spectrum aggregation, and the like.

The mobile communication terminal 100 includes: one or more antennas 110-1 to N (N is an integer equal to or more than 1) that transmit and receive radio waves; communication processing parts 120-1 to N; a communication controlling part 140; a data processing part 130; and a memory 150. The communication processing part 120-n (n is an integer equal to or more than 1 and equal to or less than N) demodulates a high-frequency signal received from the antenna 110-n to generate a data signal, and transmits the data signal as reception data to the data processing part 130. Further, the communication processing part 120-n generates a data signal from transmission data sent from the data processing part 130, and modulates the data signal into a high-frequency signal to transmit the modulated signal from the antenna 110-n. At that time, the transmission power is increased or decreased in accordance with a transmission power control signal from the communication controlling part 140. Note that, in FIG. 1, for simplicity of description, one antenna 110-n corresponds to one communication channel, and hence the plurality of antennas 110-1 to N and the plurality of communication processing parts 120-1 to N are shown in FIG. 1. Alternatively, one antenna may be shared by the communication processing parts 120-1 to N, and one communication processing part may be shared by the antennas 110-1 to N. Further, one antenna or communication processing part may be shared not only entirely but partially. Through such sharing, one antenna corresponds to a plurality of channels.

The communication controlling part 140 includes a transmission power controlling part 141 and a transmission power setting part 142. The transmission power controlling part 141 generates the transmission power control signal for controlling the communication processing parts 120-1 to N in accordance with a transmission power command decided by the transmission power setting part 142. Then, the transmission power controlling part 141 outputs the transmission power control signal to the communication processing parts 120-1 to N and the transmission power setting part 142.

The transmission power setting part 142 includes a signal receiving part 143, an arithmetic processing part 145, a determining part 146, a signal transmitting part 144, and a TPC command processing part 147. The transmission power control signal generated by the transmission power controlling part 141 is inputted to the signal receiving part 143.

On the basis of the transmission power command from the TPC command processing part 147 to be described later, the arithmetic processing part 145 generates a transmission power command signal for causing the communication processing parts 120-1 to N to generate a transmission power according to the transmission power command, and outputs the transmission power command signal to the signal transmitting part 144.

Further, on the basis of the transmission power control signal inputted to the signal receiving part 143, the arithmetic processing part 145 calculates, at a predetermined timing, the temporal averages of the transmission powers of the respective channels (average transmission powers W1a, W2a, WNa) of the mobile communication terminal 100 in a predetermined monitoring period Ta, and obtains a sum Wa thereof. Further, when the determining part 146 to be described later determines that the sum Wa of the average transmission powers is equal to or more than a threshold value Wth, the arithmetic processing part 145 calculates such a transmission power that makes the average value of the sum of the transmission powers in a predetermined control period Tc equal to the threshold value Wth.

Here, the control period Tc refers to a period from a start time point of the monitoring period Ta to an end time point of a transmission power suppression period Tb to be described later following the monitoring period Ta. The arithmetic processing part 145 generates a command signal for average power suppression for generating a transmission power according to the transmission power thus calculated. Then, during the transmission power suppression period Tb, the arithmetic processing part 145 outputs, to the signal transmitting part 144, the command signal for average power suppression as the transmission power command signal.

The determining part 146 compares the threshold value Wth with the sum Wa of the average transmission powers calculated by the arithmetic processing part 145, and reports the comparison result to the arithmetic processing part 145.

The signal transmitting part 144 outputs the transmission power command signal calculated by the arithmetic processing part 145 to the transmission power controlling part 141.

The TPC command processing part 147 acquires and analyzes a TPC command. Note that the TPC command is information that is contained in the reception data obtained by the communication processing parts 120-1 to N and designates a value of the transmission power of the mobile communication terminal 100. Then, the TPC command processing part 147 detects a transmission power command designated by each of the base stations 900-1 to K with which the mobile communication terminal 100 is communicating, and outputs the transmission power command to the arithmetic processing part 145.

The data processing part 130 executes a predetermined process on the basis of the reception data that is converted into digital signals by the communication processing parts 120-1 to N, creates the transmission data to the base stations 900-1 to K with which the mobile communication terminal 100 is communicating, and outputs the transmission data to the communication processing parts 120-1 to N.

The memory 150 stores a threshold value predetermined therein.

Note that, in FIG. 1, for ease of description, the communication processing parts 120-1 to N and the communication controlling part 140 are shown separately from each other, but a function of the communication controlling part 140 may be included in the communication processing parts 120-1 to N.

Meanwhile, the base station 900-k (k is an integer equal to or more than 1 and equal to or less than K) includes: antennas 910-k-1 to $M_k$ ($M_k$ is an integer equal to or more than 1) that transmit and receive radio waves; communication processing parts 920-k-1 to $M_k$; a data processing part 930-k; and a transmission power setting part 940-k.

The communication processing parts 920-k-1 to $M_k$ each make wireless communication with the mobile communication terminal 100 through the antennas 910-k-1 to $M_k$ to perform a data transmission and reception process. Further, the communication processing parts 920-k-1 to $M_k$ each transmit, to the mobile communication terminal 100, a TPC command set by the transmission power setting part 940-k to be described later together with transmission data. The data processing part 930-k executes a predetermined process on the basis of reception data from the mobile communication terminal 100, and generates the transmission data to the mobile communication terminal 100.

The transmission power setting part 940-k detects the reception intensity of a reception signal from the mobile communication terminal 100, and decides the transmission power of the mobile communication terminal 100 on the basis of the reception intensity. For example, the transmission power setting part 940-k sets the transmission power of the mobile communication terminal 100 such that the reception intensity of the reception signal from the mobile communication terminal 100 is constant. Then, the transmission power setting part 940-k generates the TPC command that is a command for designating the set transmission power, and outputs the TPC command to the communication processing parts 920-k-1 to $M_k$.

Next, an operation of the mobile communication system is described with reference to a flow chart of FIG. 2. The mobile communication terminal 100 executes an average transmission power reduction process shown in FIG. 2 at a predetermined timing. The mobile communication terminal 100 executes the average transmission power reduction process upon the occurrence of a predetermined start event of the average transmission power reduction process, for example, upon the communication start of a telephone call, data transmission, and the like. For "upon the occurrence of a predetermined start event of the average transmission power reduction process", one start event may be set, and the predetermined start event may refer to the one start event. Alternatively, a plurality of start events may be set, and the predetermined start event may refer to any of the plurality of start events.

In the case where the start event of the average transmission power reduction process does not occur, the mobile communication terminal 100 causes the TPC command processing part 147 to analyze the TPC command contained in the reception signal from each of the base stations 900-1 to K. Then, the transmission power controlling part 141 generates the transmission power control signal for generating the transmission power according to the transmission power command designated by each of the base stations 900-1 to K. Then, the communication processing parts 120-1 to N each control the transmission power in accordance with the transmission power control signal, whereby transmission data is transmitted with the transmission power according to the transmission power command from each of the base stations 900-1 to K (hereinafter, referred to as normal transmission power control). Consequently, the base stations 900-1 to K can receive signals from the mobile communication terminal 100 in good conditions. A unit for performing the normal transmission power control corresponds to a transmission power controlling unit, and, in the mobile communication terminal of FIG. 1, the transmission power controlling unit is implemented by the antennas 110-1 to N, the communication processing parts 120-1 to N, and the communication controlling part 140.

Figure 2:
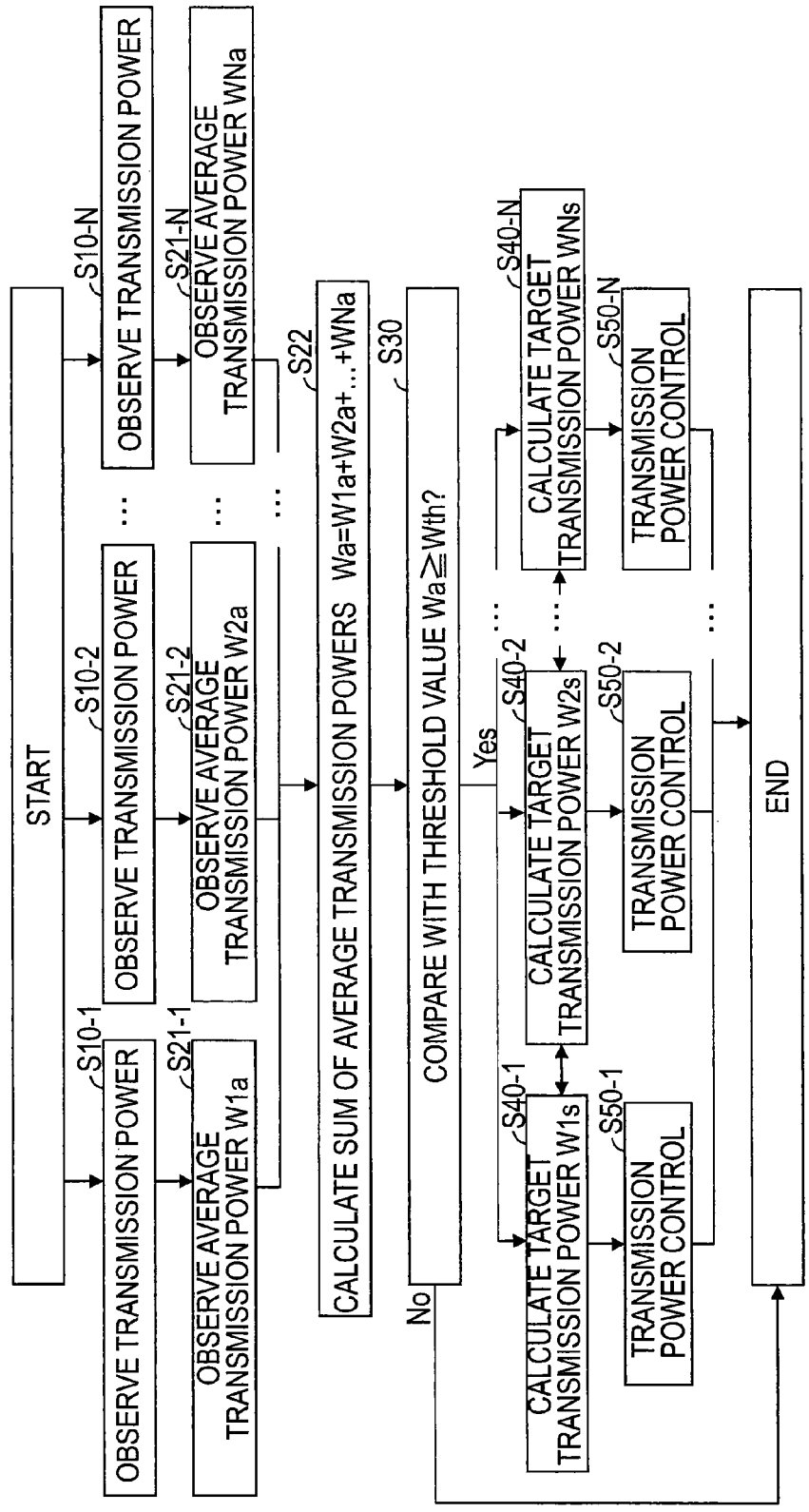
FIG. 2 is a diagram showing a processing flow of an average transmission power reduction process according to first to eighth embodiments.

In this state, when the start event of the average transmission power reduction process occurs, for example, when a telephone call is started using the mobile communication terminal 100, the mobile communication terminal 100 starts the average transmission power reduction process shown in FIG. 2.

Then, at this time point as the start time point of the monitoring period Ta, the mobile communication terminal 100 starts to observe each channel transmission power, and sequentially calculates a temporal average of a change in each transmission power (S10-1 to N). The mobile communication terminal 100 calculates temporal averages in the entire monitoring period Ta, and defines the calculated temporal averages as average transmission powers W1a, W2a, WNa of the respective channels in the monitoring period Ta (S21-1 to N). The mobile communication terminal 100 further obtains the sum Wa thereof (S22). A unit for performing Steps S10-1 to N, S21-1 to N, and S22 corresponds to an average transmission power calculating unit, and, in the mobile communication terminal 100 of FIG. 1, the average transmission power calculating unit is implemented by the antennas 110-1 to N, the communication processing parts 120-1 to N, and the communication controlling part 140.

The mobile communication terminal 100 compares the sum Wa of the average transmission powers with the threshold value Wth (S30). Then, if the sum Wa of the average transmission powers calculated in Step S22 is less than the threshold value Wth, the mobile communication terminal 100 ends the process, and performs the normal transmission power control thereafter. As a result, the mobile communication terminal 100 continues to transmit transmission data with the transmission power according to the TPC command from each of the base stations 900-1 to K. Accordingly, the transmission power is not reduced, that is, the transmission power is not unnecessarily reduced in spite of the state where data is transmitted with a relatively low transmission power.

On the other hand, if the sum Wa of the average transmission powers calculated in Step S22 is equal to or more than the threshold value Wth, the mobile communication terminal 100 moves from Step S30 to Steps S40-1 to N, and calculates such a target average transmission power Ws that makes the average value of the sum of the transmission powers in the control period Tc less than the threshold value Wth. Moreover, the mobile communication terminal 100 calculates the target transmission powers W1s, W2s, WNs of the respective channels (S40-1 to N). After this, during the transmission power suppression period Tb, the mobile communication terminal 100 performs the transmission power control such that the sum of the average value of the channel transmission powers in the transmission power suppression period Tb is equal to or less than the target average transmission power Ws (S50-1 to N). A unit for performing Steps S30, S40-1 to N, and S50-1 to N corresponds to a transmission power suppressing unit. In the mobile communication terminal 100 of FIG. 1, Steps S30 and S40-1 to N are implemented by the communication controlling part 140 and the memory 150, and Steps S50-1 to N are implemented by the antennas 110-1 to N, the communication processing parts 120-1 to N, and the communication controlling part 140.

A command value for each transmission power in the transmission power suppression period Tb may be, for example, a constant value, a monotonically increasing function, a monotonically decreasing function, a predetermined function, and any other values as long as the sum of the average value of the channel transmission powers in the transmission power suppression period Tb is equal to or less than the target average transmission power Ws.

Figure 3:
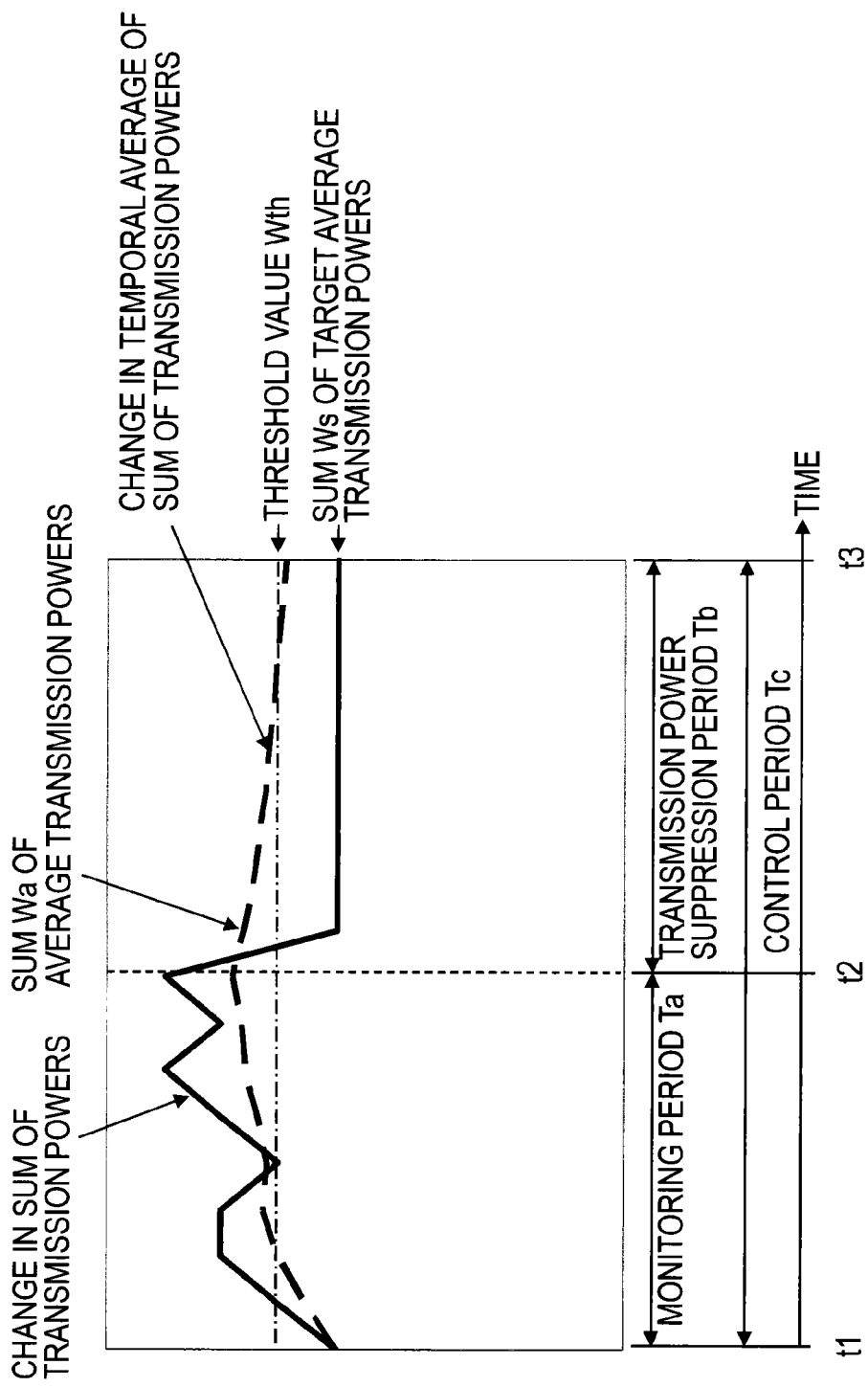
FIG. 3 is a time chart showing a changing state of the transmission power of a mobile communication terminal of the first embodiment and a changing state of a temporal average of the transmission power from a start time point t1 of a control period Tc, in the case where a sum Wa of average transmission powers in a monitoring period Ta is equal to or more than a threshold value Wth.

FIG. 3 is a time chart showing a changing state of the transmission power of the mobile communication terminal and a changing state of a temporal average of the transmission power from a start time point t1 of the control period Tc, in the case where the sum Wa of the average transmission powers in the monitoring period Ta is equal to or more than the threshold value Wth. In the following description, the number of the base stations is two, but is not limited to two. Further, another base station may be interpreted as another antenna of the same base station. Still further, one antenna may be shared.

As shown in FIG. 3, during the monitoring period Ta from the time point t1 to a time point t2, the mobile communication terminal 100 performs the normal transmission power control for controlling the transmission powers to the base stations 900-1 and 900-2 in accordance with the TPC commands from the base stations 900-1 and 900-2. Consequently, each transmission power increases or decreases in accordance with the TPC command.

Then, when the monitoring period Ta ends at the time point t2, the sum Wa of the average transmission powers in the monitoring period Ta is fixed at this time point. In the case of FIG. 3, the sum Wa of the average transmission powers in the monitoring period Ta is equal to or more than the threshold value Wth. Hence, during the transmission power suppression period Tb from the time point t2 to a time point t3, the mobile communication terminal 100 respectively controls the channel transmission powers to constant values at, for example, the target transmission powers W1s and W2s, irrespective of the TPC commands from the base stations 900-1 and 900-2. Further, the mobile communication terminal 100 controls the sum of the transmission powers to a constant value at, for example, the target transmission power Ws.

Accordingly, even when the sum of the transmission powers that are designated by the base stations 900-1 and 900-2 as the transmission power of the mobile communication terminal continues to be equal to or more than the threshold value Wth, the mobile communication terminal 100 can reduce the average value of the transmission powers to or below the threshold value Wth. As a result, the battery duration can be prevented from being shortened by a relatively large transmission power being continued, thus achieving lengthened battery duration.

[Second Embodiment]

In the first embodiment, description is given of how to control the mobile communication terminal 100 in order to efficiently reduce the average transmission powers in the control period, but how to decide the target values of the transmission powers of the respective channels is not specified. In second to eighth embodiments, how to decide the target values of the transmission powers of the respective channels is described in detail. Note that the other configurations are the same as those of the first embodiment.

Figure 4:
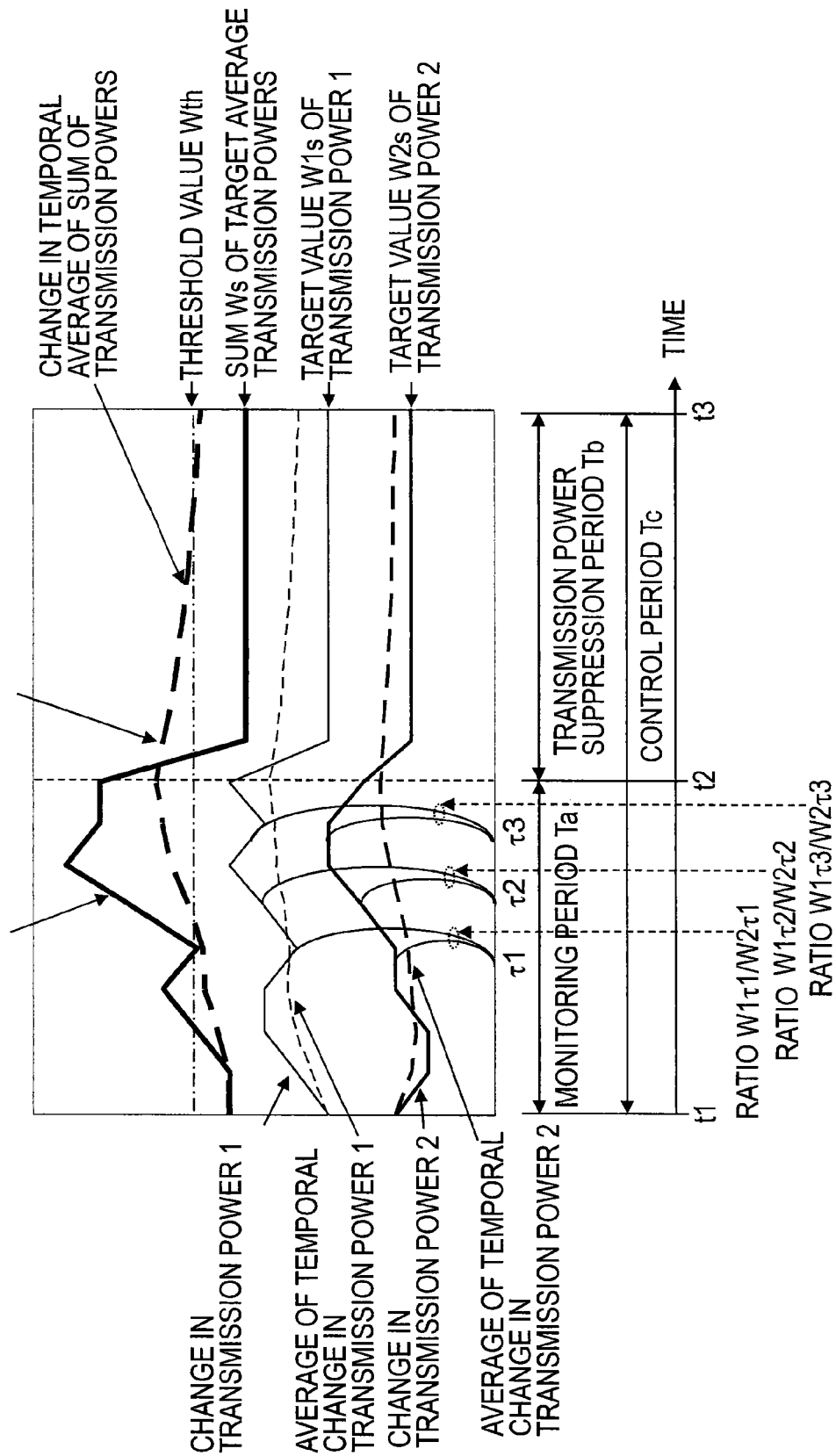
FIG. 4 is a time chart showing a changing state of the transmission power of a mobile communication terminal of the second embodiment and a changing state of a temporal average of the transmission power from the start time point t1 of the control period Tc, in the case where the sum Wa of the average transmission powers in the monitoring period Ta is equal to or more than the threshold value Wth.

For deciding the target values of the transmission powers of the respective channels in the transmission power suppression period, the transmission power suppressing unit of the present embodiment calculates the ratio of the transmission powers of channels 1 to 2 at a plurality of time points in the monitoring period Ta, and refers to the average value of the ratios of the transmission powers at the end (t2) of the monitoring period Ta. Note that the plurality of time points may be periodically determined. FIG. 4 shows an example of a time chart. It is assumed that the transmission powers of the channel 1 at time points τ1, τ2, and τ3 in the monitoring period Ta are respectively W1τ1, W1τ2, and W1τ3 and that the transmission powers of the channel 2 at the time points τ1, τ2, and τ3 in the monitoring period Ta are respectively W2τ1, W2τ2, and W2τ3. The ratios of the channel 1 to the channel 2 at the time points τ1, τ2, and τ3 are respectively W1τ1/W2τ1, W1τ2/W2τ2, and W1τ3/W2τ3. It is assumed here that the average value of these ratios of the transmission powers is Wc and that the target average transmission power for making the average value of the sum of the transmission powers in the control period Tc smaller than the threshold value Wth is Ws. The transmission power suppressing unit defines the target average transmission power W1s of the channel 1 and the target average transmission power W2s of the channel 2 as follows:

$$W1s = Ws \times Wc/(1+Wc); \text{ and}$$

$$W2s = Ws \times 1/(1+Wc).$$

In this way, the transmission power suppressing unit decides the target average transmission powers of the respective channels with reference to the sequential ratios of the transmission powers of the channels 1 to 2 required during the monitoring period Ta. Accordingly, a decrease in channel quality from the mobile communication terminal to each base station can be made substantially equal for every channel, and an extreme decrease in channel quality can be prevented.

[Third Embodiment]

Figure 5:
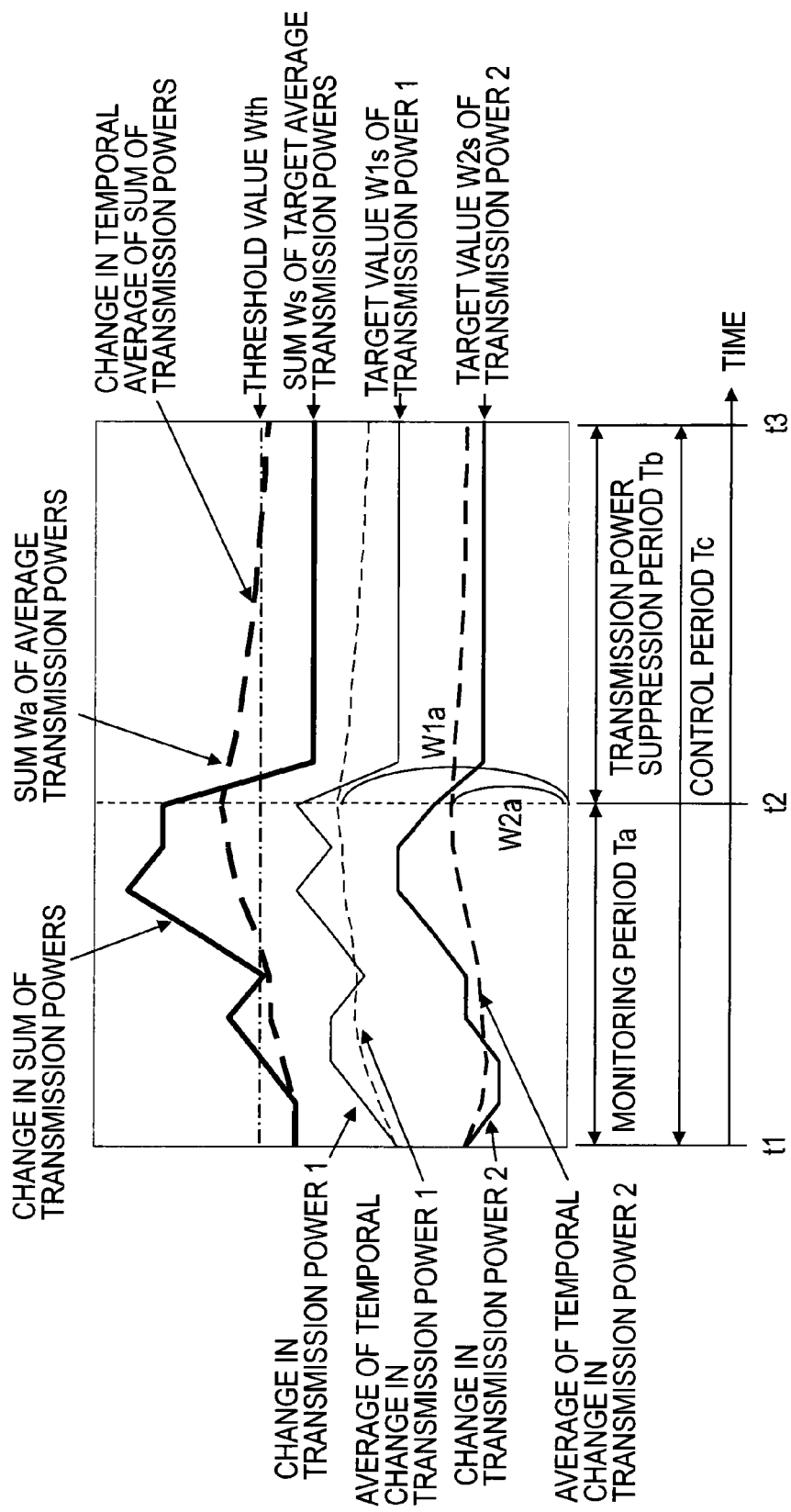
FIG. 5 is a time chart showing a changing state of the transmission power of a mobile communication terminal of the third embodiment and a changing state of a temporal average of the transmission power from the start time point t1 of the control period Tc, in the case where the sum Wa of the average transmission powers in the monitoring period Ta is equal to or more than the threshold value Wth.

For deciding the target values of the transmission powers of the respective channels in the transmission power suppression period, the transmission power suppressing unit of the present embodiment refers to the ratio of the average transmission powers of the respective channels that are calculated by the average transmission power calculating unit. FIG. 5 shows an example of a time chart. It is assumed here that the average transmission powers of the channels 1 and 2 in the monitoring period Ta are respectively W1a and W2a and that the target average transmission power for making the average value of the sum of the transmission powers in the control period Tc smaller than the threshold value Wth is Ws. The transmission power suppressing unit defines the target average transmission power W1s of the channel 1 and the target average transmission power W2s of the channel 2 as follows:

$$W1s = Ws \times W1a/(W1a+W2a); \text{ and}$$

$$W2s = Ws \times W2a/(W1a+W2a).$$

In this way, the transmission power suppressing unit decides the target average transmission powers of the respective channels with reference to the average values of the respective transmission powers of the channels 1 and 2 required during the monitoring period Ta. Accordingly, a decrease in channel quality from the mobile communication terminal to each base station can be made substantially equal for every channel, and an extreme decrease in channel quality can be prevented.

[Fourth Embodiment]

Figure 6:
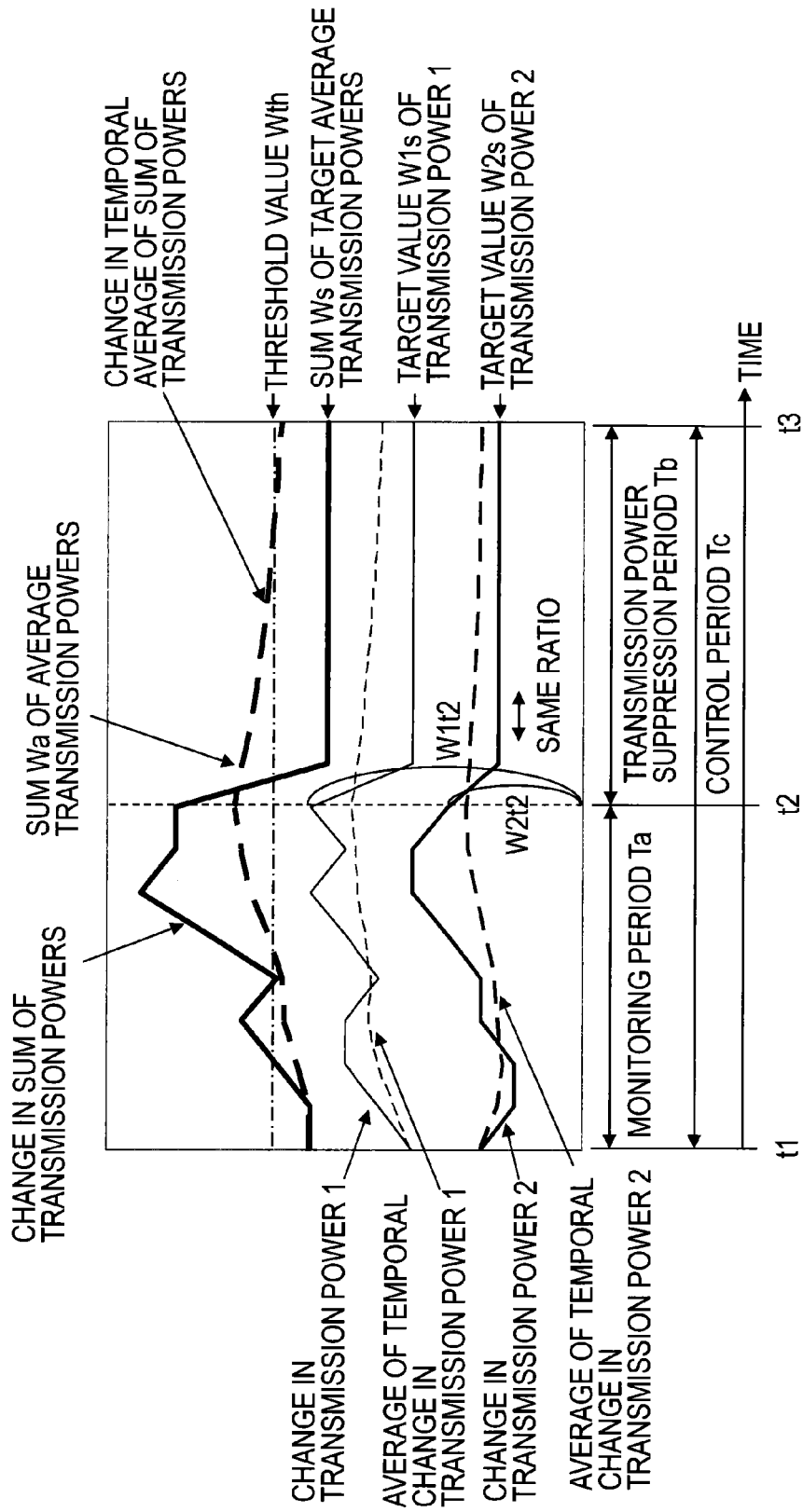
FIG. 6 is a time chart showing a changing state of the transmission power of a mobile communication terminal of the fourth embodiment and a changing state of a temporal average of the transmission power from the start time point t1 of the control period Tc, in the case where the sum Wa of the average transmission powers in the monitoring period Ta is equal to or more than the threshold value Wth.

For deciding the target values of the transmission powers of the respective channels in the transmission power suppression period, the transmission power suppressing unit of the present embodiment refers to the ratio of the transmission powers of the respective channels at the end of the monitoring period. FIG. 6 shows an example of a time chart. It is assumed here that the transmission powers of the channels 1 and 2 at the end (t2) of the monitoring period Ta are respectively W1t2 and W2t2 and that the target average transmission power for making the average value of the sum of the transmission powers in the control period Tc smaller than the threshold value Wth is Ws. The transmission power suppressing unit defines the target average transmission power W1s of the channel 1 and the target average transmission power W2s of the channel 2 as follows:

$$W1s = Ws \times W1t2/(W1t2+W2t2); \text{ and}$$

$$W2s = Ws \times W2t2/(W1t2+W2t2).$$

In this way, the transmission power suppressing unit decides the target average transmission powers of the respective channels with reference to the respective transmission powers of the channels 1 and 2 required at the end (t2) of the monitoring period Ta. Accordingly, a decrease in channel quality from the mobile communication terminal to each base station can be made substantially equal for every channel, and an extreme decrease in channel quality can be prevented.

[Fifth Embodiment]

Figure 7:
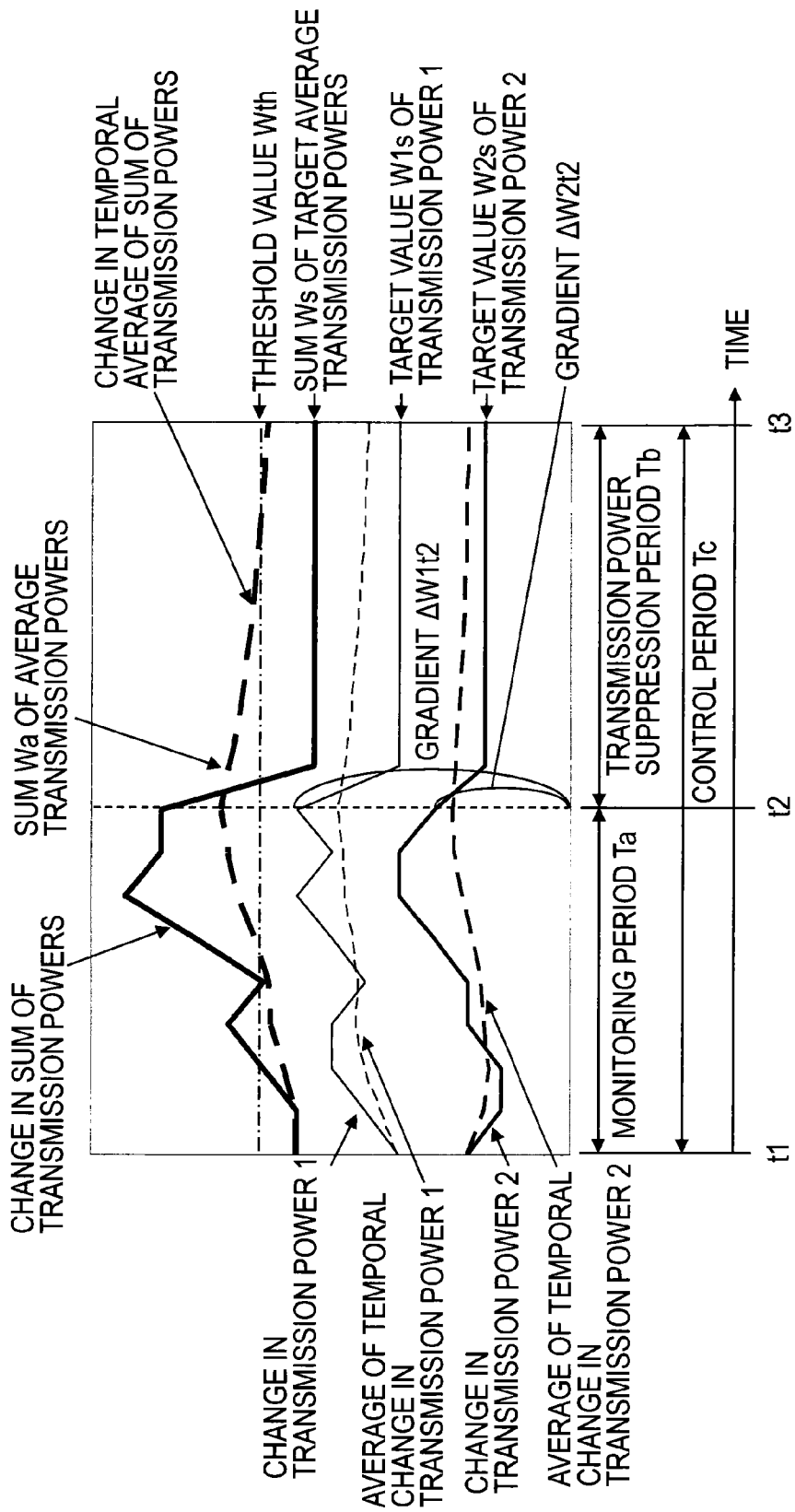
FIG. 7 is a time chart showing a changing state of the transmission power of a mobile communication terminal of the fifth embodiment and a changing state of a temporal average of the transmission power from the start time point t1 of the control period Tc, in the case where the sum Wa of the average transmission powers in the monitoring period Ta is equal to or more than the threshold value Wth.

For deciding the target values of the transmission powers of the respective channels in the transmission power suppression period, the transmission power suppressing unit of the present embodiment refers to an estimated transmission power that is obtained by considering the temporal change rate of the transmission power of each channel at the end of the monitoring period Ta. FIG. 7 shows an example of a time chart. It is assumed here that the temporal change rates of the transmission powers of the channels 1 and 2 at the end (t2) of the monitoring period Ta are respectively ΔW1t2 and ΔW2t2 and that the estimated transmission powers that will be required thereafter are W1t2+ΔW1t2 for the channel 1 and W2t2+ΔW2t2 for the channel 2. It is also assumed that the target average transmission power for making the average value of the sum of the transmission powers in the control period Tc smaller than the threshold value Wth is Ws. The transmission power suppressing unit defines the target average transmission power W1s of the channel 1 and the target average transmission power W2s of the channel 2 as follows:

$$W1s = Ws \times (W1t2+\Delta W1t2)/(W1t2+\Delta W+W2t2+\Delta W2t2);$$

and $$W2s = Ws \times (W2t2+\Delta W2t2)/(W1t2+\Delta W1t2+W2t2+\Delta W2t2).$$

In this way, the transmission power suppressing unit decides the target average transmission powers of the respective channels with reference to the respective transmission powers of the channels 1 and 2 that will be required after the monitoring period Ta. Accordingly, a decrease in channel quality from the mobile communication terminal to each base station can be made substantially equal for every channel, and an extreme decrease in channel quality can be prevented.

[Sixth Embodiment]

Figure 8:
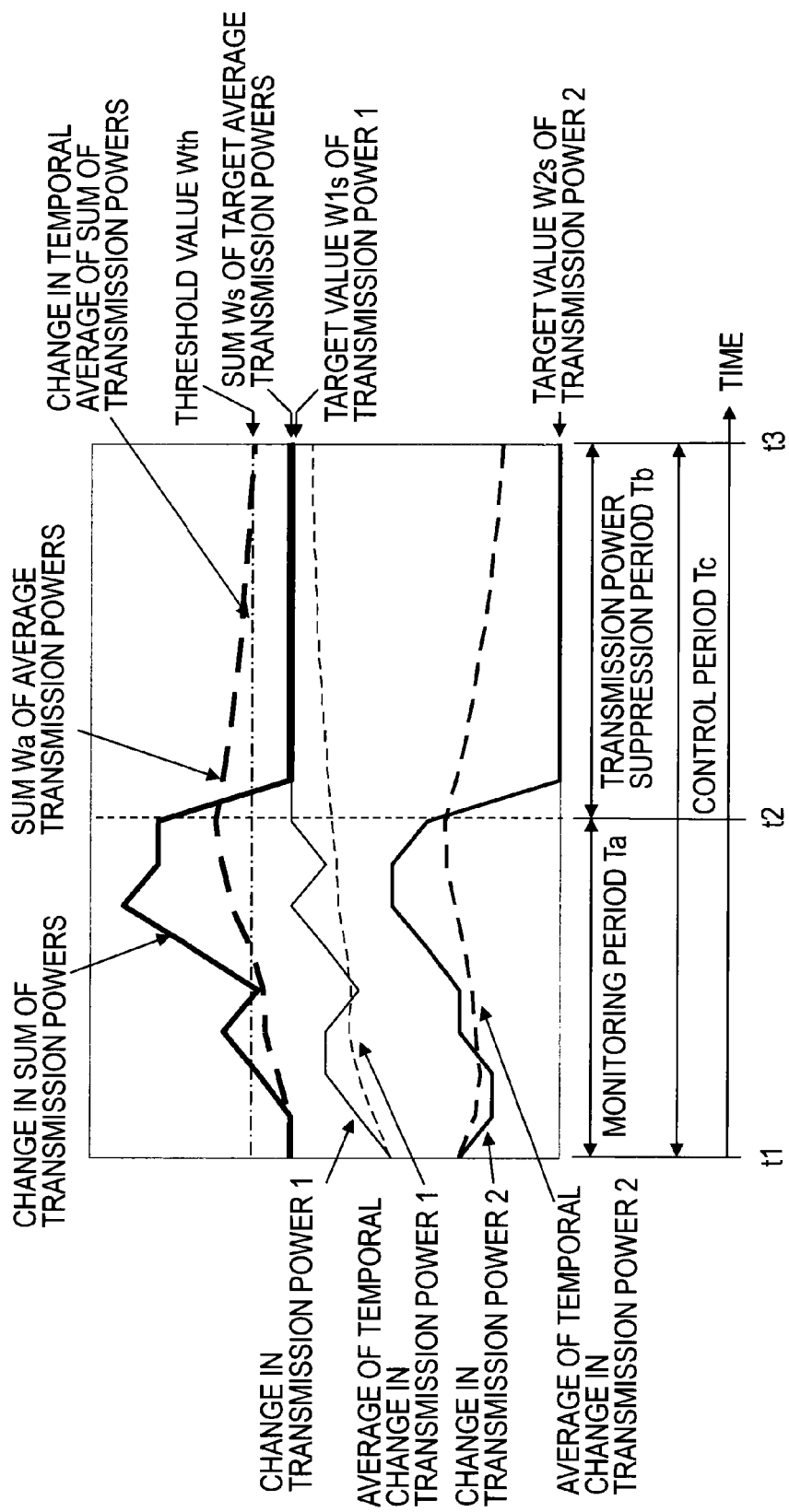
FIG. 8 is a time chart showing a changing state of the transmission power of a mobile communication terminal of the sixth embodiment and a changing state of a temporal average of the transmission power from the start time point t1 of the control period Tc, in the case where the sum Wa of the average transmission powers in the monitoring period Ta is equal to or more than the threshold value Wth.

For deciding the target values of the transmission powers of the respective channels in the transmission power suppression period, the transmission power suppressing unit of the present embodiment sets 0 to the transmission power(s) of one or more channels. FIG. 8 shows an example of a time chart. During the transmission power suppression period Tb after the monitoring period Ta, even if the transmission power(s) of one or more channels are a minimum value of the mobile wireless terminal tolerated by the wireless system to which the one or more channel(s) belong(s), in the case where the average value of the sum of the transmission powers in the control period Tc is larger than the threshold value Wth, the transmission power suppressing unit sets 0 to the transmission power(s) of the one or more channels. On the other hand, if the transmission power(s) of one or more channels is a maximum value of the mobile wireless terminal tolerated by the wireless system to which the one or more channel(s) belong(s), in the case where the average value of the sum of the transmission powers in the control period Tc is larger than the threshold value Wth, the transmission power suppressing unit determines the target average transmission power Ws such that the average value of the sum of the transmission powers is equal to or less than the threshold value Wth, and performs the transmission power control. Alternatively, the transmission power suppressing unit sets 0 to the transmission power of a channel having a poorer communication quality among the communication qualities of the respective channels. With such control, communications of as many channels as possible can be secured even when communication conditions are bad.

[Seventh Embodiment]

Figure 9:
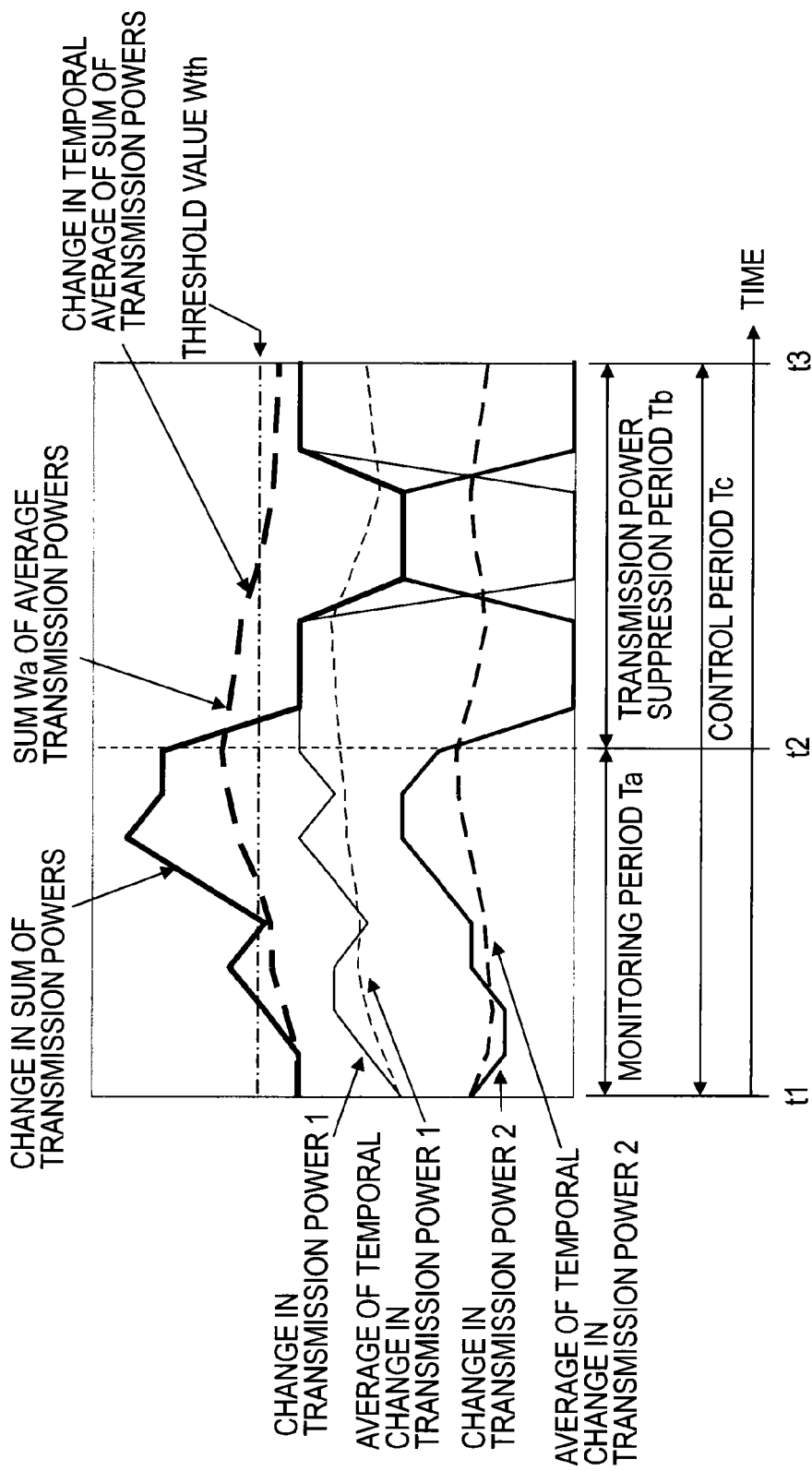
FIG. 9 is a time chart showing a changing state of the transmission power of a mobile communication terminal of the seventh embodiment and a changing state of a temporal average of the transmission power from the start time point t1 of the control period Tc, in the case where the sum Wa of the average transmission powers in the monitoring period Ta is equal to or more than the threshold value Wth.

For deciding the target values of the transmission powers of the respective channels in the transmission power suppression period, the transmission power suppressing unit of the present embodiment transmits and receives data by switching to only selected channels. FIG. 9 shows an example of a time chart. During the transmission power suppression period Tb after the monitoring period Ta, the transmission power suppressing unit transmits and receives data by switching to only the selected channels. In this way, even if the transmission powers of the selected channels are a maximum value of the mobile wireless terminal tolerated by the wireless system to which the selected channels belong, in the case where the average value of the sum of the transmission powers in the control period Tc is larger than the threshold value Wth, the transmission power suppressing unit uses only the selected channels. Alternatively, during transmission and reception of data by switching to only the selected channels, if the transmission powers of the selected channels are the maximum value of the mobile wireless terminal tolerated by the wireless system to which the selected channels belong, in the case where the average value of the sum of the transmission powers in the control period Tc is larger than the threshold value Wth, the transmission power suppressing unit determines the target average transmission power Ws such that the average value of the sum of the transmission powers of the selected channels is equal to or less than the threshold value Wth, and performs the transmission power control of the selected channels. The channel selection is decided in accordance with the communication quality of each channel. With such control, communications of as many channels as possible can be secured even when communication conditions are bad.

[Eighth Embodiment]

The average transmission power calculating unit of the present embodiment calculates an average transmission power during each of the monitoring periods that are temporally shifted in an overlapping manner. The transmission power suppressing unit performs reduction control of the transmission powers in the control period correspondingly to a monitoring period having the largest value among the plurality of average transmission powers calculated by the average transmission power calculating unit. As a result, the moving average can be obtained, and hence such transmission power control that can always keep the average value of the sum of the channel transmission powers below the threshold value Wth can be performed.

[Ninth Embodiment]

The configuration of a mobile communication system of the ninth embodiment is the same as that of FIG. 1. In the present embodiment, a sum RWa of the ratios of the average transmission powers of the respective channels to threshold values of the corresponding channels is compared with a threshold value RWth (a threshold value of the sum), instead of comparing the sum Wa of the average transmission powers of the respective channels with the threshold value Wth. An operation of the present embodiment is described with reference to FIG. 10. It is assumed that the threshold values of the transmission powers of the channels are respectively W1th, W2th, . . . , WNth.

Figure 10:
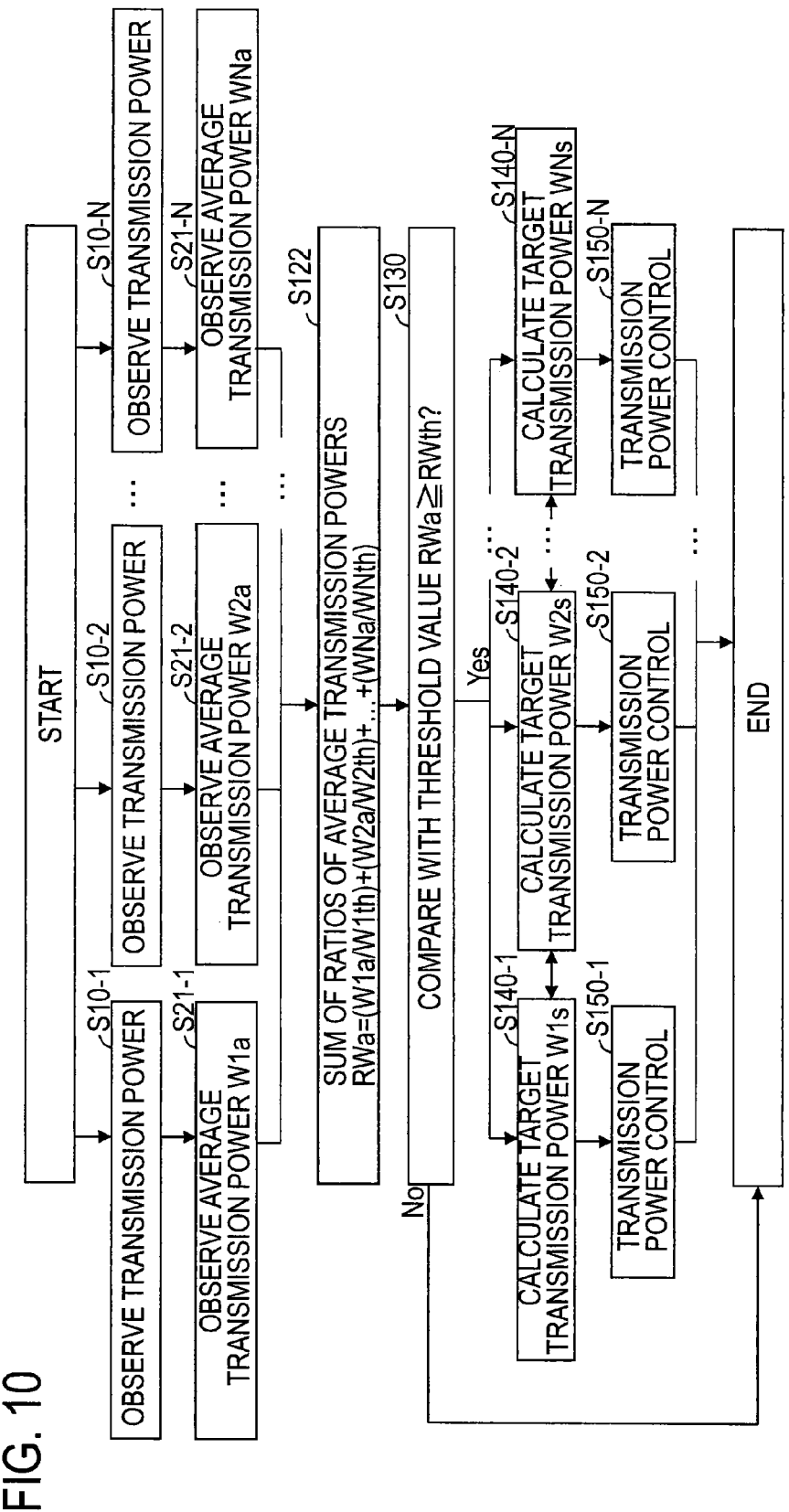
FIG. 10 is a diagram showing a processing flow of an average transmission power reduction process according to ninth to sixteenth embodiments.

The mobile communication terminal 100 starts an average transmission power reduction process shown in FIG. 10, in the case where a start event of the average transmission power reduction process, for example, the start of a telephone call using the mobile communication terminal 100 occurs with normal transmission power control being performed. Note that the normal transmission power control is the same as that of the first embodiment. A unit for performing the normal transmission power control corresponds to a transmission power controlling unit, and, in the mobile communication terminal 100 of FIG. 1, the transmission power controlling unit is implemented by the antennas 110-1 to N, the communication processing parts 120-1 to N, and the communication controlling part 140.

Then, at this time point as the start time point of the monitoring period Ta, the mobile communication terminal 100 starts to observe each channel transmission power, and sequentially calculates a temporal average of a change in each channel transmission power (S10-1 to N). The mobile communication terminal 100 calculates temporal averages in the entire monitoring period Ta, and defines the calculated temporal averages as average transmission powers W1a, W2a, WNa of the respective channels in the monitoring period Ta (S21-1 to N). Moreover, the mobile communication terminal 100 obtains the ratios of W1a, W2a, WNa to the threshold values of the respective channels, that is, obtains average transmission power ratios RW1a=W1a/W1th, RW2a=W2a/W2th, . . . , RWNa=WNa/WNth of the respective channels. The mobile communication terminal 100 further obtains the sum RWa thereof (S122). A unit for performing Steps S10-1 to N, S21-1 to N, and S122 corresponds to an average transmission power calculating unit, and, in the mobile communication terminal 100 of FIG. 1, the average transmission power calculating unit is implemented by the antennas 110-1 to N, the communication processing parts 120-1 to N, and the communication controlling part 140.

The mobile communication terminal 100 compares the sum RWa of the ratios of the average transmission powers with the threshold value RWth (the threshold value of the sum) (S130). Then, if the sum RWa of the ratios of the average transmission powers from the respective antennas calculated in Step S122 is less than the threshold value RWth, the mobile communication terminal 100 ends the process, and performs the normal transmission power control thereafter. As a result, the mobile communication terminal 100 continues to transmit transmission data with the transmission power according to the TPC command from each of the base stations 900-1 to K. Accordingly, the transmission power is not reduced, that is, the transmission power is not unnecessarily reduced in spite of the state where data is transmitted with a relatively low transmission power.

On the other hand, if the sum RWa of the ratios of the average transmission powers calculated in Step S122 is equal to or more than the threshold value RWth, the mobile communication terminal 100 moves from Step S130 to Steps S140-1 to N, and calculates such a target average transmission power ratio RWs that makes the sum of the average transmission power ratios of the respective channels in the control period Tc less than the threshold value RWth. Moreover, the mobile communication terminal 100 calculates the target transmission powers W1s, W2s, ... WNs of the respective channels (S140-1 to N). After this, during the transmission power suppression period Tb, the mobile communication terminal 100 performs the transmission power control such that the sum of the ratios of the average transmission powers of the respective channels in the transmission power suppression period Tb is equal to or less than the sum RWs of the target average transmission power ratios (S150-1 to N). A unit for performing Steps S130, S140-1 to N, and S150-1 to N corresponds to a transmission power suppressing unit. In the mobile communication terminal 100 of FIG. 1, Steps S130 and S140-1 to N are implemented by the communication controlling part 140 and the memory 150, and Steps S150-1 to N are implemented by the antennas 110-1 to N, the communication processing parts 120-1 to N, and the communication controlling part 140.

A command value for each transmission power in the transmission power suppression period Tb may be a constant value, a monotonically increasing function, a monotonically decreasing function, a predetermined function, and any other values as long as the sum RWa of the average transmission power ratios of the respective channels in the transmission power suppression period Tb is equal to or less than the sum RWs of the target average transmission power ratios.

Figure 11:
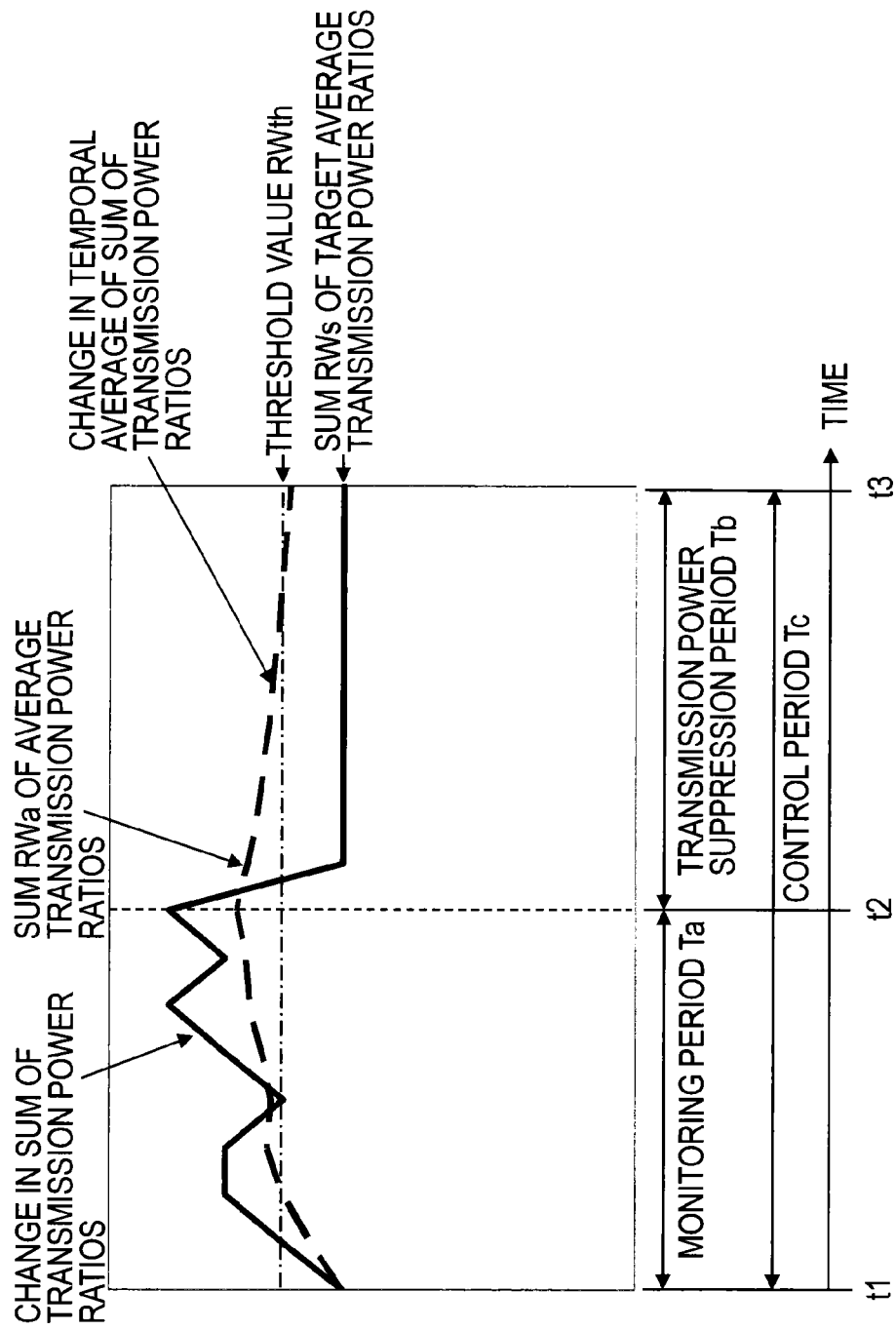
FIG. 11 is a time chart showing a changing state of the transmission power of a mobile communication terminal of the ninth embodiment and a changing state of a temporal average of the transmission power from the start time point t1 of the control period Tc, in the case where a sum RWa of average transmission power ratios in the monitoring period Ta is equal to or more than a threshold value RWth.

FIG. 11 is a time chart showing a changing state of the transmission power of the mobile communication terminal and a changing state of a temporal average of the transmission power from the start time point t1 of the control period Tc, in the case where the sum RWa of the average transmission power ratios in the monitoring period Ta is equal to or more than the threshold value RWth. In the following description, the number of the base stations is two, but is not limited to two. Further, another base station may be interpreted as another antenna of the same base station. Still further, one antenna may be shared.

As shown in FIG. 11, during the monitoring period Ta from the time point t1 to the time point t2, the mobile communication terminal 100 performs the normal transmission power control for controlling the transmission powers to the base stations 900-1 and 900-2 in accordance with the TPC commands from the base stations 900-1 and 900-2. Consequently, each transmission power increases or decreases in accordance with the TPC command.

Then, when the monitoring period Ta ends at the time point t2, the sum RWa of the average transmission power ratios in the monitoring period Ta is fixed at this time point. In the case of FIG. 11, the sum RWa of the average transmission power ratios in the monitoring period Ta is equal to or more than the threshold value RWth. Hence, during the transmission power suppression period Tb from the time point t2 to the time point t3, the mobile communication terminal 100 respectively controls the channel transmission powers to constant values at, for example, the target transmission powers W1s and W2s, irrespective of the TPC commands from the base stations 900-1 and 900-2. Further, the mobile communication terminal 100 controls the sum of the transmission power ratios to a constant value at, for example, the target transmission power ratio RWs.

Accordingly, even when the sum of the transmission power ratios that are designated by the base stations 900-1 and 900-2 as the transmission power of the mobile communication terminal continues to be equal to or more than the threshold value RWth, the mobile communication terminal 100 can reduce the average value of the transmission power ratios to or below the threshold value RWth. As a result, the battery duration can be prevented from being shortened by a relatively large transmission power being continued, thus achieving lengthened battery duration.

[Tenth Embodiment]

In the ninth embodiment, description is given of how to control the mobile communication terminal 100 in order to efficiently reduce the average transmission powers in the control period, but how to decide the target values of the transmission powers of the respective channels is not specified. In tenth to sixteenth embodiments, how to decide the target values W1s, W2s, WNs of the transmission powers of the respective channels is described in detail. Note that the other configurations are the same as those of the ninth embodiment.

Figure 12:
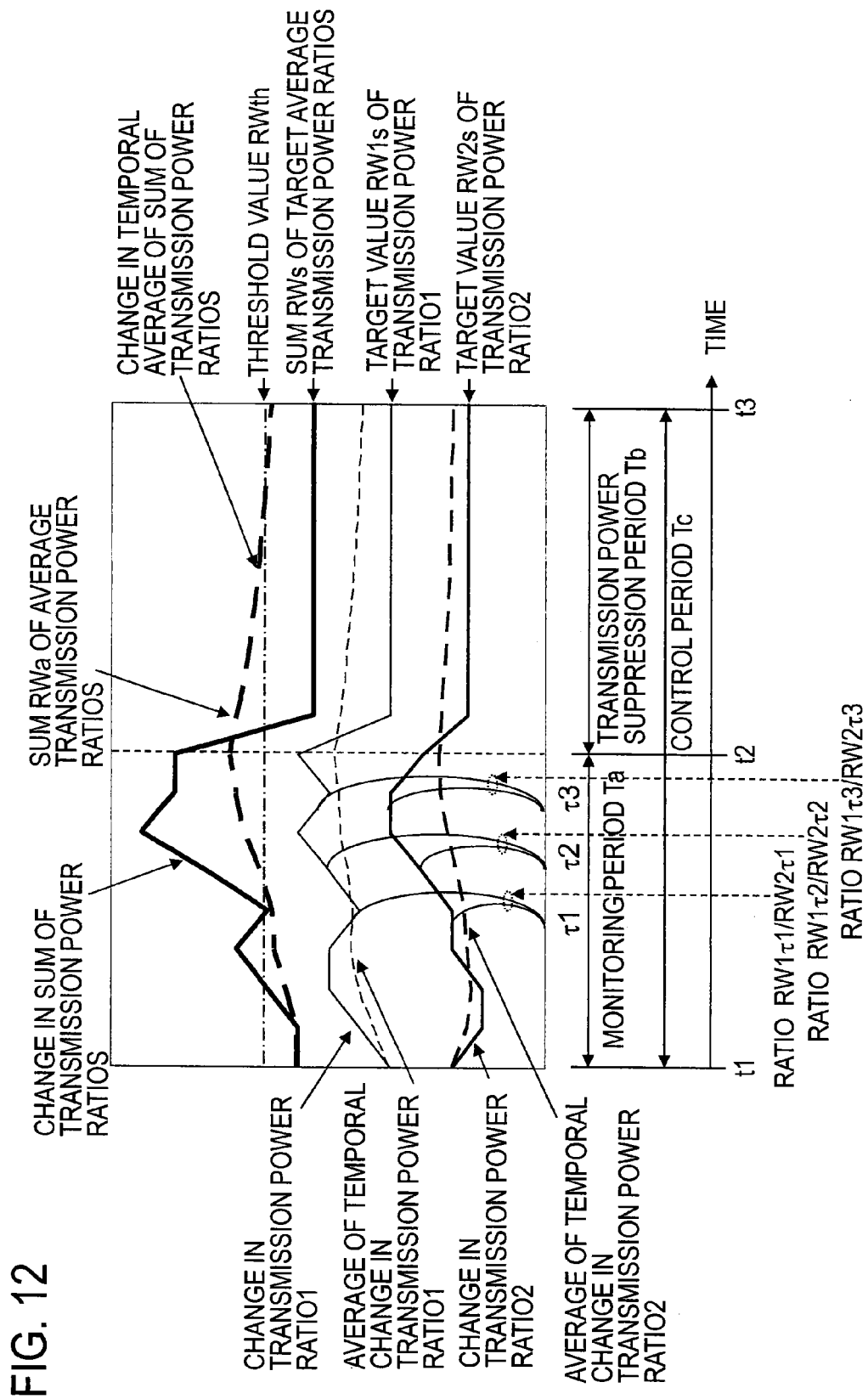
FIG. 12 is a time chart showing a changing state of the transmission power of a mobile communication terminal of the tenth embodiment and a changing state of a temporal average of the transmission power from the start time point t1 of the control period Tc, in the case where the sum RWa of the average transmission power ratios in the monitoring period Ta is equal to or more than the threshold value RWth.

For deciding the target values of the transmission powers of the respective channels in the transmission power suppression period, the transmission power suppressing unit of the present embodiment calculates the ratio of: the ratio (transmission power ratio) of the transmission power of the channel 1 to the threshold value of the channel 1, to the transmission power ratio of the channel 2, at a plurality of time points in the monitoring period Ta, and refers to the average value of the ratios of the transmission power ratios at the end (t2) of the monitoring period Ta. Note that the plurality of time points may be periodically determined. FIG. 12 shows an example of a time chart. It is assumed that the transmission powers of the channel 1 at the time points τ1, τ2, and τ3 in the monitoring period Ta are respectively W1τ1, W1τ2, and W1τ3 and that the transmission powers of the channel 2 at the time points τ1, τ2, and τ3 in the monitoring period Ta are respectively W2τ1, W2τ2, and W2τ3. The ratios of the transmission power ratio of the channel 1 to the transmission power ratio of the channel 2 at the time points τ1, τ2, and τ3 are as follows:

$$RW1\tau1/RW2\tau1=(W1\tau1/W1th)/(W2\tau1/W2th);$$

$$RW1\tau2/RW2\tau2=(W1\tau2/W1th)/(W2\tau2/W2th); \text{ and}$$

$$RW1\tau3/RW2\tau3=(W1\tau3/W1th)/(W2\tau3/W2th).$$

It is assumed here that the average value of these ratios of the transmission power ratios is RWc and that the target average transmission power ratio for making the average value of the sum of the transmission power ratios in the control period Tc smaller than the threshold value RWth is RWs. The transmission power suppressing unit defines the target average transmission power ratio $RW1s$ of the channel 1 and the target average transmission power ratio $RW2s$ of the channel 2 as follows:

$$RW1s = RWs \times RWc/(1+RWc); \text{ and}$$

$$RW2s = RWs \times 1/(1+RWc).$$

Then, the transmission power suppressing unit defines the target average transmission power $W1s$ of the channel 1 and the target average transmission power $W2s$ of the channel 2 as follows:

$$W1s = RW1s \times W1th; \text{ and}$$

$$W2s = RW2s \times W2th.$$

In this way, the transmission power suppressing unit decides the target average transmission powers of the respective channels with reference to the sequential ratios of the transmission power ratios of the channels 1 to 2 required during the monitoring period Ta. Accordingly, a decrease in channel quality from the mobile communication terminal to each base station can be made substantially equal for every channel, and an extreme decrease in channel quality can be prevented.

[Eleventh Embodiment]

Figure 13:
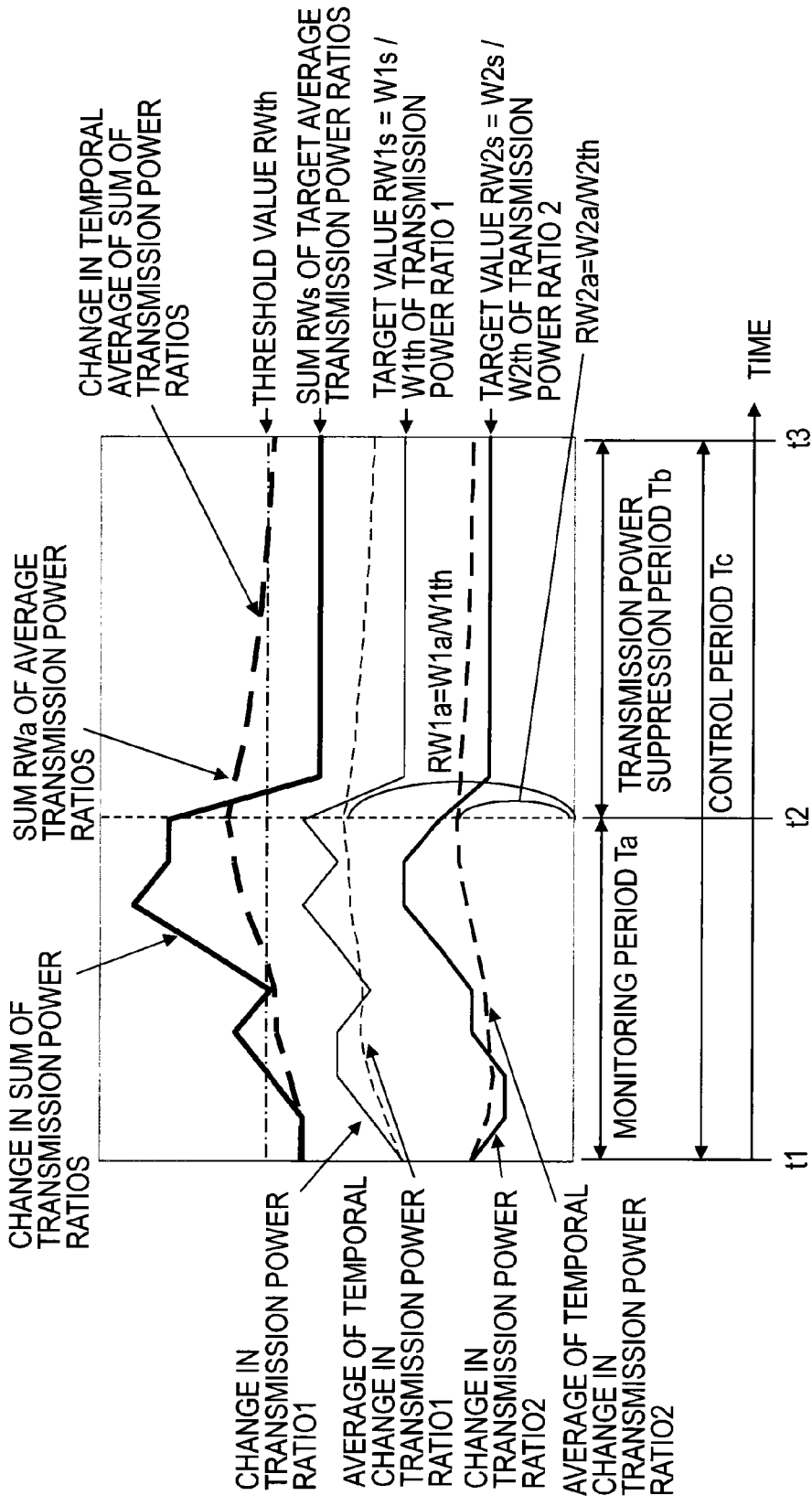
FIG. 13 is a time chart showing a changing state of the transmission power of a mobile communication terminal of the eleventh embodiment and a changing state of a temporal average of the transmission power from the start time point t1 of the control period Tc, in the case where the sum RWa of the average transmission power ratios in the monitoring period Ta is equal to or more than the threshold value RWth.

For deciding the target values of the transmission powers of the respective channels in the transmission power suppression period, the transmission power suppressing unit of the present embodiment refers to ratios of ratios of the respective channels which are ratios of the average values of the average transmission powers of the corresponding channels calculated by the average transmission power calculating unit to the threshold values of the corresponding channels. FIG. 13 shows an example of a time chart. It is assumed here that the average transmission powers of the channels 1 and 2 in the monitoring period Ta are respectively $W1a$ and $W2a$ and that the threshold values of the channels 1 and 2 are respectively $W1th$ and $W2th$. It is also assumed that the target average transmission power ratio for making the average transmission power ratio in the control period Tc smaller than the threshold value $RWth$ of the sum is $RWs$. The transmission power suppressing unit defines the target average transmission power ratio $RW1s$ of the channel 1 and the target average transmission power ratio $RW2s$ of the channel 2 as follows:

$$RW1s = RWs \times (W1a/W1th)/((W1a/W1th)+(W2a/W2th));$$

and $$RW2s = RWs \times (W2a/W2th)/((W1a/W1th)+(W2a/W2th)).$$

Then, the transmission power suppressing unit defines the target average transmission power $W1s$ of the channel 1 and the target average transmission power $W2s$ of the channel 2 as follows:

$$W1s = RW1s \times W1th; \text{ and}$$

$$W2s = RW2s \times W2th.$$

In this way, the transmission power suppressing unit decides the target average transmission powers of the respective channels with reference to the channel 1 to channel 2 ratio of: the average value of the transmission powers of each channel required during the monitoring period Ta to the threshold value of the corresponding channel. Accordingly, a decrease in channel quality from the mobile communication terminal to each base station can be made substantially equal for every channel, and an extreme decrease in channel quality can be prevented.

[Twelfth Embodiment]

Figure 14:
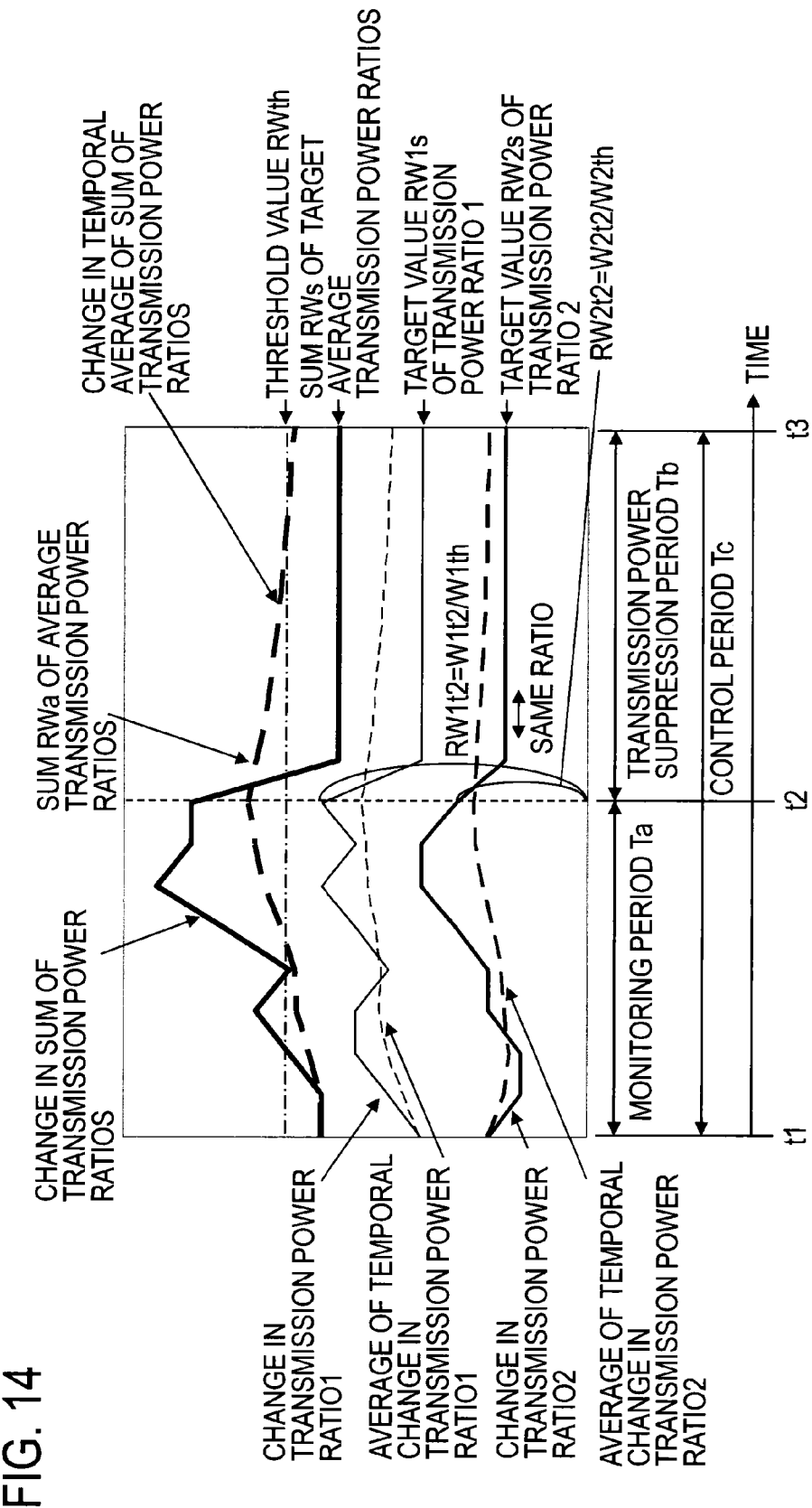
FIG. 14 is a time chart showing a changing state of the transmission power of a mobile communication terminal of the twelfth embodiment and a changing state of a temporal average of the transmission power from the start time point t1 of the control period Tc, in the case where the sum RWa of the average transmission power ratios in the monitoring period Ta is equal to or more than the threshold value RWth.

For deciding the target values of the transmission powers of the respective channels in the transmission power suppression period, the transmission power suppressing unit of the present embodiment refers to ratios of ratios of the respective channels which are ratios of the transmission powers of the corresponding channels at the end (t2) of the monitoring period Ta to the threshold values of the corresponding channels. FIG. 14 shows an example of a time chart. It is assumed here that the transmission powers of the channels 1 and 2 at the end (t2) of the monitoring period Ta are respectively $W1t2$ and $W2t2$ and that the threshold values of the channels 1 and 2 are respectively $W1th$ and $W2th$. It is also assumed that the target average transmission power ratio for making the average transmission power ratio in the control period Tc smaller than the threshold value $RWth$ of the sum is $RWs$. The transmission power suppressing unit defines the target average transmission power ratio $RW1s$ of the channel 1 and the target average transmission power ratio $RW2s$ of the channel 2 as follows:

$$RW1s = RWs \times (W1t2/W1th)/((W1t2/W1th)+(W2t2/W2th));$$

and $$RW2s = RWs \times (W2t2/W2th)/((W1t2/W1th)+(W2t2/W2th)).$$

Then, the transmission power suppressing unit defines the target average transmission power of the channel 1 and the target average transmission power $W2s$ of the channel 2 as follows:

$$W1s = RW1s \times W1th; \text{ and}$$

$$W2s = RW2s \times W2th.$$

In this way, the transmission power suppressing unit decides the target average transmission powers of the respective channels with reference to the channel 1 to channel 2 ratio of: the transmission power of each channel required at the end (t2) of the monitoring period Ta to the threshold value of the corresponding channel. Accordingly, a decrease in channel quality from the mobile communication terminal to each base station can be made substantially equal for every channel, and an extreme decrease in channel quality can be prevented.

[Thirteenth Embodiment]

Figure 15:
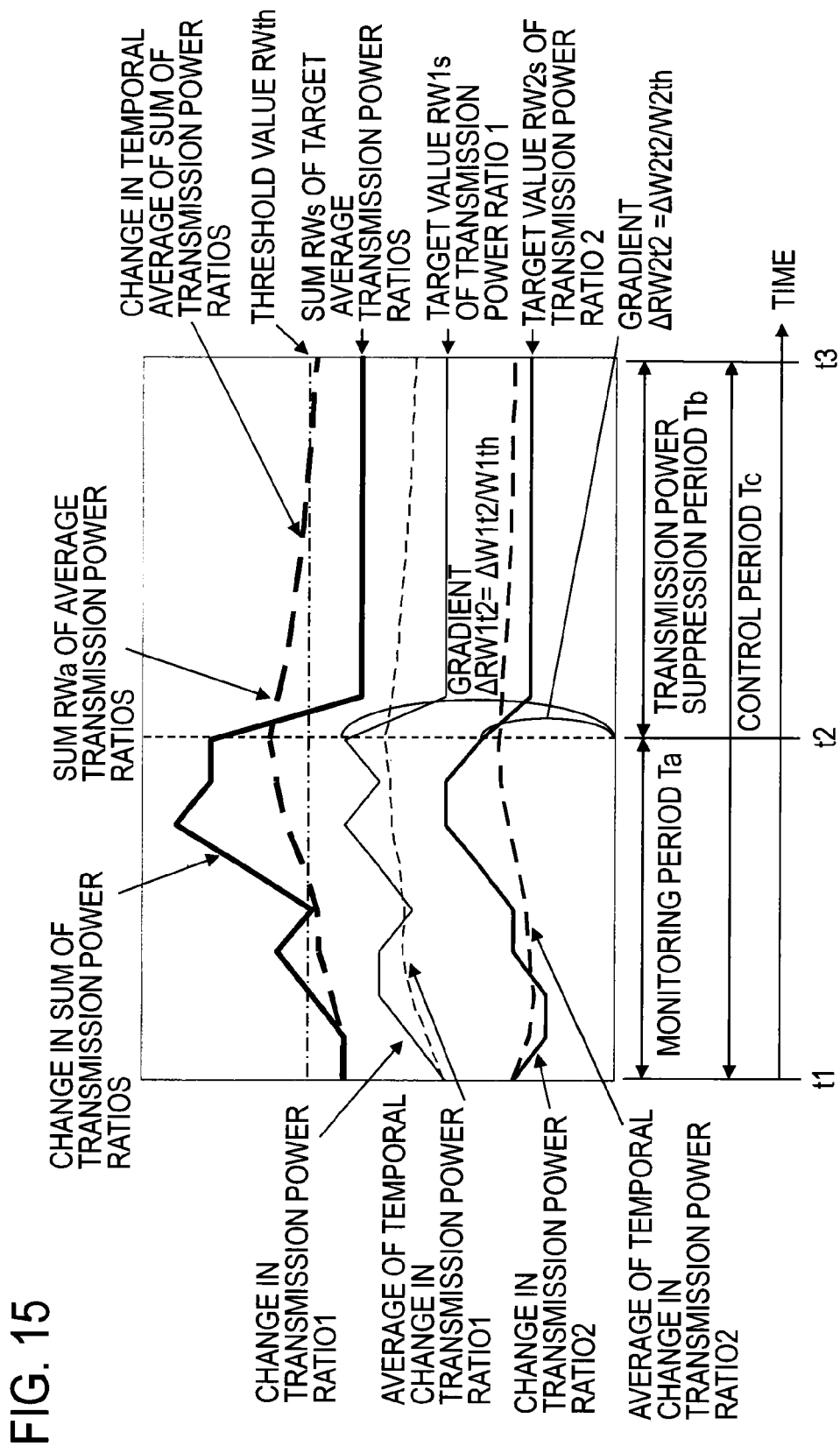
FIG. 15 is a time chart showing a changing state of the transmission power of a mobile communication terminal of the thirteenth embodiment and a changing state of a temporal average of the transmission power from the start time point t1 of the control period Tc, in the case where the sum RWa of the average transmission power ratios in the monitoring period Ta is equal to or more than the threshold value RWth.

For deciding the target values of the transmission powers of the respective channels in the transmission power suppression period, the transmission power suppressing unit of the present embodiment refers to ratios of ratios of the respective channels which are ratios of the estimated transmission powers that is obtained by considering the temporal change rate of the transmission powers of the corresponding channels at the end (t2) of the monitoring period Ta to the threshold values of the transmission powers of the corresponding channels. FIG. 15 shows an example of a time chart. It is assumed here that the temporal change rates of the transmission powers of the channels 1 and 2 at the end (t2) of the monitoring period Ta are respectively $\Delta W1t2$ and $\Delta W2t2$ and that the estimated transmission powers that will be required thereafter are $W1t2+\Delta W1t2$ for the channel 1 and $W2t2+\Delta W2t2$ for the channel 2. It is also assumed that the target average transmission power ratio for making the sum of the average transmission power ratios of the respective channels in the control period Tc smaller than the threshold value $RWth$ of the sum is $RWs$. The transmission power suppressing unit defines the target average transmission power ratio $RW1s$ of the channel 1 and the target average transmission power ratio $RW2s$ of the channel 2 as follows:

$$RW1s = RWs \times ((W1t2 + \Delta W1t2)/W1th)/(((W1t2 + \Delta W1t2)/W1th) + ((W2t2 + \Delta W2t2)/W2th)); \text{ and}$$

$$RW2s = RWs \times ((W2t2 + \Delta W2t2)/W2th)/(((W1t2 + \Delta W1t2)/W1th) + ((W2t2 + \Delta W2t2)/W2th)).$$

Then, the transmission power suppressing unit defines the target average transmission power $W1s$ of the channel 1 and the target average transmission power $W2s$ of the channel 2 as follows:

$$W1s = RW1s \times W1th; \text{ and}$$

$$W2s = RW2s \times W2th.$$

In this way, the transmission power suppressing unit decides the target average transmission powers of the respective channels with reference to the respective transmission powers of the channels 1 and 2 that will be required after the monitoring period Ta. Accordingly, a decrease in channel quality from the mobile communication terminal to each base station can be made substantially equal for every channel, and an extreme decrease in channel quality can be prevented.

[Fourteenth Embodiment]

Figure 16:
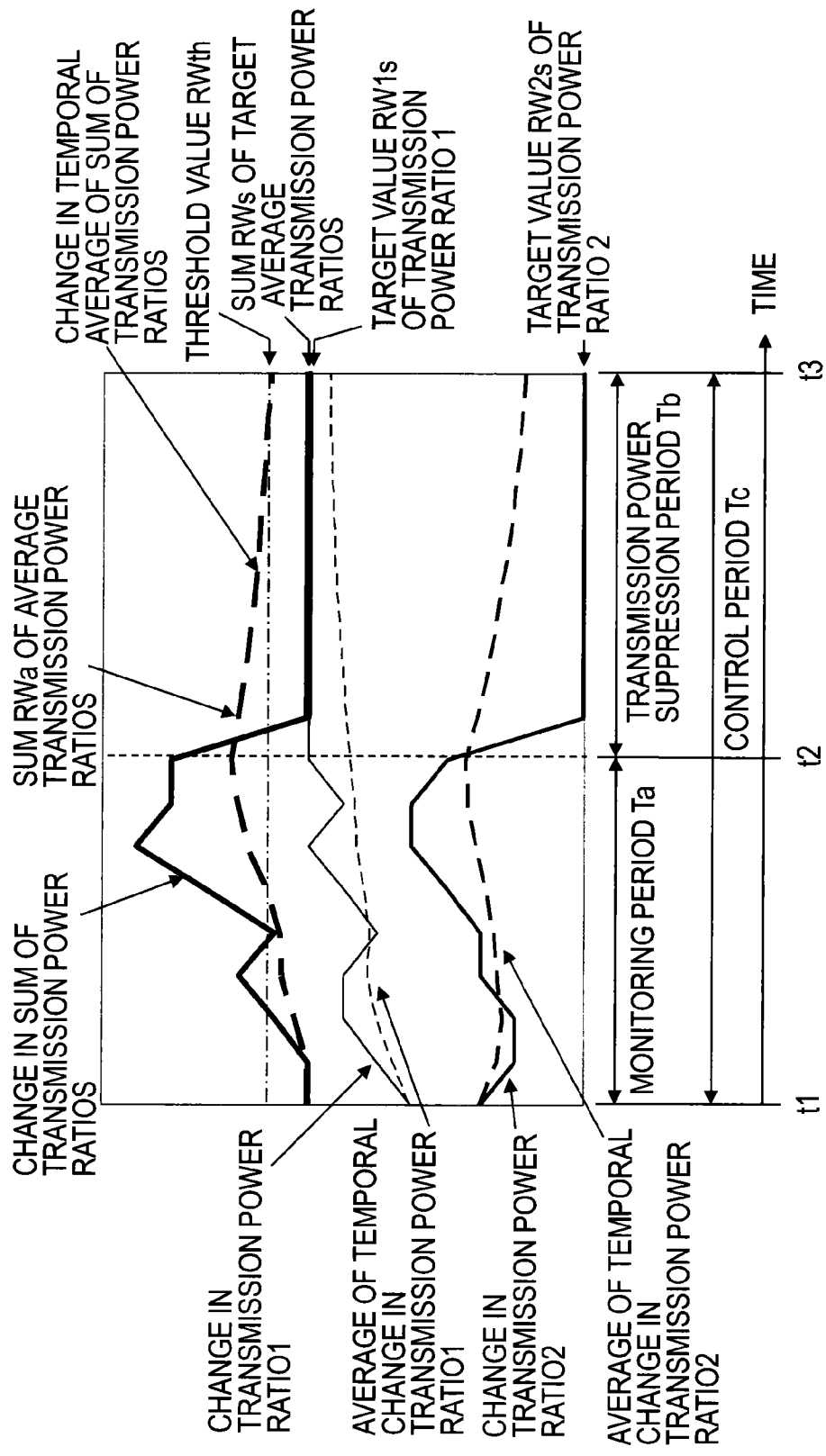
FIG. 16 is a time chart showing a changing state of the transmission power of a mobile communication terminal of the fourteenth embodiment and a changing state of a temporal average of the transmission power from the start time point t1 of the control period Tc, in the case where the sum RWa of the average transmission power ratios in the monitoring period Ta is equal to or more than the threshold value RWth.

For deciding the target values of the transmission powers of the respective channels in the transmission power suppression period, the transmission power suppressing unit of the present embodiment sets 0 to the transmission power(s) of one or more channels. FIG. 16 shows an example of a time chart. During the transmission power suppression period Tb after the monitoring period Ta, even if the transmission power(s) of one or more channels are a minimum value of the mobile wireless terminal tolerated by the wireless system to which the one or more channel(s) belong(s), in the case where the sum of the ratios of the average transmission powers of the respective channels in the control period Tc is larger than the threshold value RWth of the sum, the transmission power suppressing unit sets 0 to the transmission power(s) of the one or more channels. On the other hand, if the transmission power(s) from one or more antennas is a maximum value of the mobile wireless terminal tolerated by the wireless system to which the one or more antenna(s) belong(s), in the case where the average value of the sum of the ratios of the transmission powers in the control period Tc is larger than the threshold value RWth of the sum, the transmission power suppressing unit determines the target average transmission power Ws such that the average value of the sum of the ratios of the transmission powers is equal to or less than the threshold value RWth of the sum, and performs the transmission power control. Alternatively, the transmission power suppressing unit sets 0 to the transmission power of a channel having a poorer communication quality among the communication qualities of the respective channels. With such control, communications of as many channels as possible can be secured even when communication conditions are bad.

[Fifteenth Embodiment]

Figure 17:
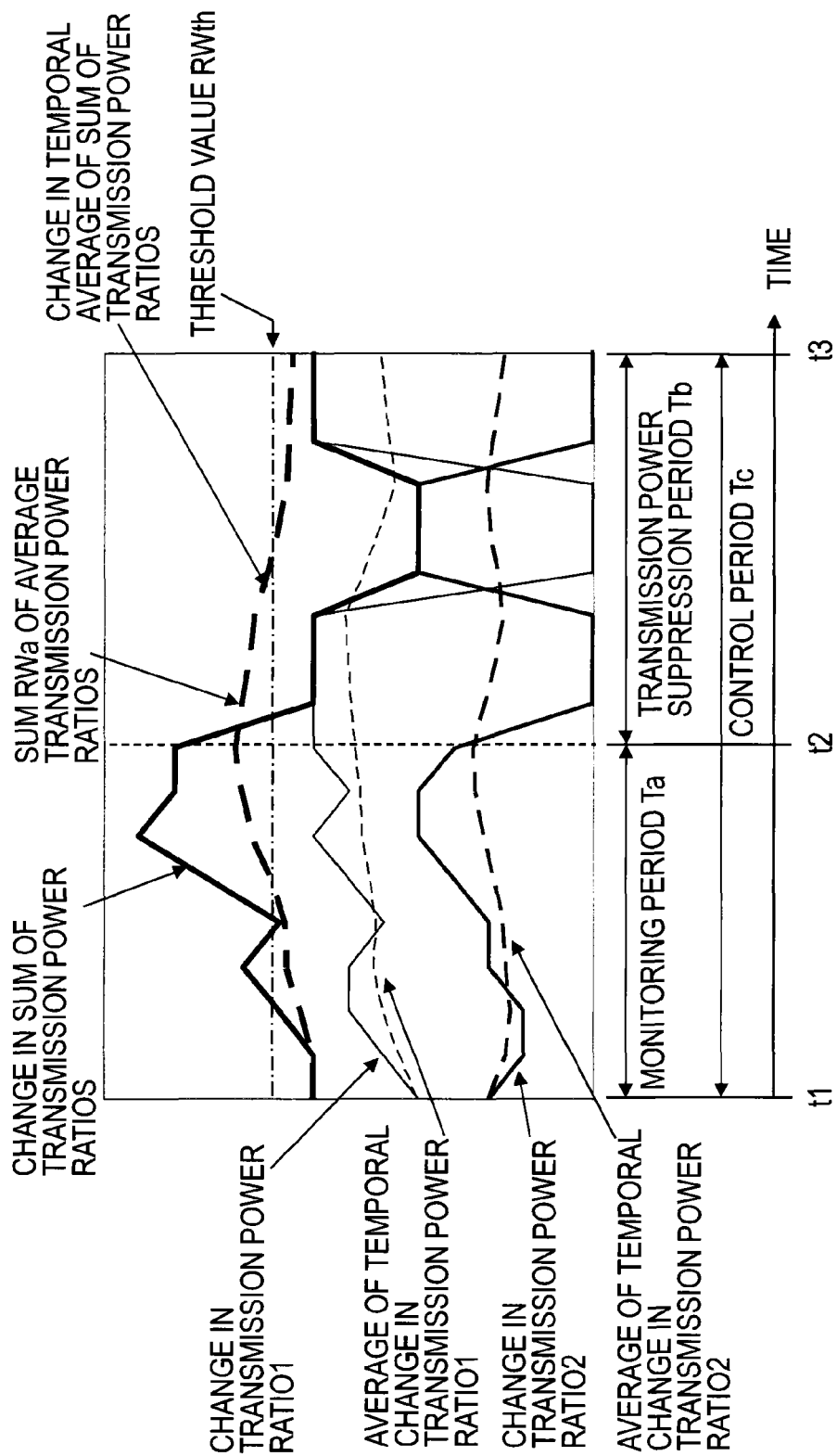
FIG. 17 is a time chart showing a changing state of the transmission power of a mobile communication terminal of the fifteenth embodiment and a changing state of a temporal average of the transmission power from the start time point t1 of the control period Tc, in the case where the sum RWa of the average transmission power ratios in the monitoring period Ta is equal to or more than the threshold value RWth.

For deciding the target values of the transmission powers of the respective channels in the transmission power suppression period, the transmission power suppressing unit of the present embodiment transmits and receives data by switching to only selected channels. FIG. 17 shows an example of a time chart. During the transmission power suppression period Tb after the monitoring period Ta, the transmission power suppressing unit transmits and receives data by switching to only the selected channels. In this way, even if the transmission powers of the selected channels are a maximum value of the mobile wireless terminal tolerated by the wireless system to which the selected channels belong, in the case where the sum of the ratios of the average transmission powers of the respective channels in the control period Tc to the threshold values of the respective channels is larger than the threshold value RWth of the sum, the transmission power suppressing unit uses only the selected channels. Alternatively, during transmission and reception of data by switching to only the selected channels, if the transmission powers of the selected channels are the maximum value of the mobile wireless terminal tolerated by the wireless system to which the selected channels belong, in the case where the sum of the average transmission power ratios in the control period Tc is larger than the threshold value RWth of the sum, the transmission power suppressing unit determines the target average transmission power Ws such that the sum of the average transmission power ratios of the selected channels is equal to or less than the threshold value RWth of the sum, and performs the transmission power control of the selected channels. The channel selection is decided in accordance with the communication quality of each channel. With such control, communications of as many channels as possible can be secured even when communication conditions are bad.

[Sixteenth Embodiment]

The average transmission power calculating unit of the present embodiment calculates an average transmission power during each of the monitoring periods that are temporally shifted in an overlapping manner. The transmission power suppressing unit performs reduction control of the transmission powers in the control period correspondingly to a monitoring period having the largest value among the plurality of average transmission powers calculated by the average transmission power calculating unit. As a result, the moving average can be obtained, and hence such transmission power control that can always keep the sum of the average transmission power ratios of the respective channels below the threshold value RWth of the sum can be performed.

DESCRIPTION OF REFERENCE NUMERALS 100 mobile communication terminal
110, 910 antenna
120, 920 communication processing part
130, 930 data processing part
140 communication controlling part
141 transmission power controlling part
142, 940 transmission power setting part
143 signal receiving part
144 signal transmitting part
145 arithmetic processing part
146 determining part
147 TPC command processing part
150 memory
900 base station

What is claimed is:

1. A mobile communication terminal that simultaneously transmits data through a plurality of channels, comprising:
   circuitry configured to
      perform transmission power control such that a sum of transmission powers is a target value;
      calculate a sum of average transmission powers of the respective channels in a monitoring period; and
      perform reduction control of the transmission powers, wherein
   a control period is set so as to include the monitoring period and a transmission power suppression period following the monitoring period, and the circuitry reduces, when the sum of the average transmission powers of the respective channels in the monitoring period is equal to or more than a threshold value of the sum of the average transmission powers of the respective channels, the transmission powers of the respective channels in the transmission power suppression period such that the average value of the sum of the transmission powers of the respective channels in the control period is equal to or less than the threshold value.

2. The mobile communication terminal according to claim 1, wherein the circuitry is configured to
decide target values of the transmission powers of the respective channels in the transmission power suppression period, on a basis of an average value of ratios of the transmission powers of the respective channels at a plurality of time points in the monitoring period, and
reduce the transmission powers in the transmission power suppression period such that the average value of the sum of the transmission powers of the respective channels in the control period is equal to or less than the threshold value.

3. The mobile communication terminal according to claim 1, wherein the circuitry is configured to
decide target values of the transmission powers of the respective channels in the transmission power suppression period, on a basis of ratios of the average transmission powers of the respective channels calculated by the circuitry, and
reduce the transmission powers in the transmission power suppression period such that the average value of the sum of the transmission powers of the respective channels in the control period is equal to or less than the threshold value.

4. The mobile communication terminal according to claim 1, wherein the circuitry is configured to
decide target values of the transmission powers of the respective channels in the transmission power suppression period, on a basis of ratios of the transmission powers of the respective channels at an end of the monitoring period, and
reduce the transmission powers in the transmission power suppression period such that the average value of the sum of the transmission powers of the respective channels in the control period is equal to or less than the threshold value.

5. The mobile communication terminal according to claim 1, wherein the circuitry is configured to
decide target values of the transmission powers of the respective channels in the transmission power suppression period, on a basis of the transmission powers of the respective channels at an end of the monitoring period and temporal change rates thereof, and
reduce the transmission powers in the transmission power suppression period such that the average value of the sum of the transmission powers of the respective channels in the control period is equal to or less than the threshold value.

6. The mobile communication terminal according to claim 1, wherein the circuitry is configured to
set 0 to the transmission power(s) of one or more channels in the transmission power suppression period, and decide target values of the transmission powers of the respective channels other than the one or more channels, and
reduce the transmission powers in the transmission power suppression period such that the average value of the sum of the transmission powers of the respective channels in the control period is equal to or less than the threshold value.

7. The mobile communication terminal according to claim 1, wherein the circuitry is configured to
transmit and receive data in the transmission power suppression period by switching to only selected channels, and
reduce the transmission powers in the transmission power suppression period such that the average value of the sum of the transmission powers of the respective channels in the control period is equal to or less than the threshold value.

8. The mobile communication terminal according to one of claims 1 to 7, wherein the circuitry is configured to
calculate an average transmission power during each of a plurality of monitoring periods that are temporally shifted in an overlapping manner, and
perform reduction control in the control period corresponding to the monitoring period having a largest value among the plurality of average transmission powers calculated by the circuitry.

9. A mobile communication terminal that simultaneously transmits data through a plurality of channels, comprising:
circuitry configured to
perform transmission power control such that a sum of transmission powers is a target value;
calculate a sum of ratios of average transmission powers of the respective channels in a monitoring period to threshold values of the corresponding channels; and
perform reduction control of the transmission powers, wherein
a control period is set so as to include the monitoring period and a transmission power suppression period following the monitoring period, and
the circuitry reduces, when the sum of the ratios of the average transmission powers of the respective channels in the monitoring period is equal to or more than a threshold value of the sum of the ratios of the average transmission powers of the respective channels, the transmission powers of the respective channels in the transmission power suppression period such that the sum of the ratios of the average transmission powers of the respective channels in the control period is equal to or less than the threshold value of the sum of the ratios.

10. The mobile communication terminal according to claim 9, wherein the circuitry is configured to
decide target values of the transmission powers of the respective channels in the transmission power suppression period, on a basis of an average value of ratios of ratios of the respective channels which are ratios of the transmission powers of the corresponding channels at a plurality of time points in the monitoring period to the threshold values of the corresponding channels, and
reduce the transmission powers in the transmission power suppression period such that the sum of the ratios of the average transmission powers of the respective channels in the control period is equal to or less than the threshold value of the sum of the ratios.

11. The mobile communication terminal according to claim 9, wherein the circuitry is configured to
decide target values of the transmission powers of the respective channels in the transmission power suppression period, on a basis of ratios of ratios of the respective channels which are ratios of the average transmission powers of the corresponding channels calculated by the circuitry to the threshold values of the corresponding channels, and reduce the transmission powers in the transmission power suppression period such that the sum of the ratios of the average transmission powers of the respective channels in the control period is equal to or less than the threshold value of the sum of the ratios.

12. The mobile communication terminal according to claim 9, wherein the circuitry is configured to decide target values of the transmission powers of the respective channels in the transmission power suppression period, on a basis of ratios of the respective channels which are ratios of the transmission powers of the corresponding channels at an end of the monitoring period to the threshold values of the corresponding channels, and reduce the transmission powers in the transmission power suppression period such that the sum of the ratios of the average transmission powers of the respective channels in the control period is equal to or less than the threshold value of the sum of the ratios.

13. The mobile communication terminal according to claim 9, wherein the circuitry is configured to decide target values of the transmission powers of the respective channels in the transmission power suppression period, on a basis of ratios of the transmission powers of the respective channels at an end of the monitoring period to the threshold values of the corresponding channels; and temporal change rates thereof, and reduce the transmission powers in the transmission power suppression period such that the sum of the ratios of the average transmission powers of the respective channels in the control period is equal to or less than the threshold value of the sum of the ratios.

14. The mobile communication terminal according to claim 9, wherein the circuitry is configured to set 0 to the transmission power(s) of one or more channels in the transmission power suppression period, and decide target values of the transmission powers of the respective channels other than the one or more channels, and reduce the transmission powers in the transmission power suppression period such that the sum of the ratios of the average transmission powers of the respective channels in the control period is equal to or less than the threshold value of the sum of the ratios.

15. The mobile communication terminal according to claim 9, wherein the circuitry is configured to transmit and receive data in the transmission power suppression period by switching to only selected channels, and reduce the transmission powers in the transmission power suppression period such that the sum of the ratios of the average transmission powers of the selected channels in the control period is equal to or less than the threshold value of the sum of the ratios.

16. The mobile communication terminal according to one of claims 9 to 15, wherein the circuitry is configured to calculate an average transmission power during each of a plurality of monitoring periods that are temporally shifted in an overlapping manner, and perform reduction control in the control period corresponding to the monitoring period having a largest value among the plurality of average transmission powers calculated by the circuitry.

* * * * *